US012702968B2

(12) United States Patent
Li et al.

(10) Patent No.: US 12,702,968 B2
(45) Date of Patent: Aug. 11, 2026

(54) THREE-WAY CONVERSION CATALYST COMPOSITION COMPRISING PLATINUM-RHODIUM BIMETALLIC COMPONENTS

(71) Applicant: BASF Mobile Emissions Catalysts LLC, Iselin, NJ (US)

(72) Inventors: Yuejin Li, Iselin, NJ (US); Andreas Sundermann, Heidelberg (DE); Xiaolai Zheng, Iselin, NJ (US); Yipeng Sun, Iselin, NJ (US); Karifala Dumbuya, Hannover (DE); Pascaline Tran, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 439 days.

(21) Appl. No.: 18/043,964

(22) PCT Filed: Sep. 23, 2021

(86) PCT No.: PCT/EP2021/076195
§ 371 (c)(1),
(2) Date: Mar. 3, 2023

(87) PCT Pub. No.: WO2022/073770
PCT Pub. Date: Apr. 14, 2022

(65) Prior Publication Data

US 2023/0321635 A1 Oct. 12, 2023

(30) Foreign Application Priority Data

Oct. 9, 2020 (EP) .................................... 20200951

(51) Int. Cl.
*B01J 23/10* (2006.01)
*B01D 53/86* (2006.01)
(Continued)

(52) U.S. Cl.
CPC ............ *B01J 23/42* (2013.01); *B01D 53/865* (2013.01); *B01J 21/04* (2013.01); *B01J 21/066* (2013.01);
(Continued)

(58) Field of Classification Search
CPC ... B01J 21/04; B01J 23/10; B01J 23/42; B01J 23/464; B01J 37/0201; B01J 21/066;
(Continued)

(56) References Cited

U.S. PATENT DOCUMENTS 4,405,506 A 9/1983 Kim
5,057,483 A * 10/1991 Wan ...................... B01J 23/894 423/213.5

(Continued)

FOREIGN PATENT DOCUMENTS

WO 2015/143191 A1 9/2015

OTHER PUBLICATIONS

International Search Report and Written Opinion from corresponding PCT International Appln. No. PCT/EP2021/076195 dated Dec. 6, 2021.

(Continued)

*Primary Examiner* — Cam N. Nguyen
(74) *Attorney, Agent, or Firm* — DLA Piper LLP (US)

(57) ABSTRACT

The present invention provides a catalyst composition comprising a) platinum; b) rhodium; and c) a ceria-alumina composite, a zirconia composite or a mixture thereof, wherein platinum is supported on the ceria-alumina composite, zirconia composite or mixture thereof, wherein rhodium is supported on the ceria-alumina composite, zirconia composite or mixture thereof, wherein $CeO_2$ in the ceria alumina composite is 1.0 to 50 wt. %, based on the total weight of the ceria-alumina composite, wherein the amount of $ZrO_2$ in the zirconia composite is 50 to 99 wt. %, based (Continued)

on the total weight of the zirconia composite. The present invention also provides a catalytic article comprising the catalyst composition and its preparation.

21 Claims, 10 Drawing Sheets

(51) Int. Cl.

| | |
|---|---|
| ***B01J 21/04*** | (2006.01) |
| ***B01J 21/06*** | (2006.01) |
| ***B01J 23/42*** | (2006.01) |
| ***B01J 23/46*** | (2006.01) |
| ***B01J 23/63*** | (2006.01) |
| ***B01J 35/56*** | (2024.01) |
| ***B01J 37/02*** | (2006.01) |
| ***B01J 37/04*** | (2006.01) |
| ***F01N 3/10*** | (2006.01) |

(52) U.S. Cl.
CPC ............. *B01J 23/10* (2013.01); *B01J 23/464* (2013.01); *B01J 35/56* (2024.01); *B01J 37/0201* (2013.01); *B01J 37/04* (2013.01); *F01N 3/101* (2013.01); *F01N 2330/18* (2013.01); *F01N 2570/10* (2013.01); *F01N 2570/12* (2013.01); *F01N 2570/14* (2013.01)

(58) Field of Classification Search
CPC ... B01J 35/56; B01J 37/04; B01J 23/63; B01J 35/19; B01J 37/0215; B01J 37/038; B01D 53/865; B01D 2255/1021; B01D 2255/1025; B01D 2255/2061; B01D 2255/2063; B01D 2255/2065; B01D 2255/2068; B01D 2255/20715; B01D 2255/407; B01D 2255/908; B01D 2255/9155; B01D 53/945; F01N 3/101; F01N 2330/18; F01N 2570/10; F01N 2570/12; F01N 2570/14; F01N 3/10; Y02T 10/12
USPC .......................... 502/304, 332, 333, 339, 349
See application file for complete search history.

(56) References Cited

U.S. PATENT DOCUMENTS

| | | | | |
|---|---|---|---|---|
| 8,673,809 | B2 * | 3/2014 | Nakatsuji | B01J 35/613 502/527.12 |
| 8,950,174 | B2 * | 2/2015 | Hilgendorff | B01J 23/63 60/299 |
| 9,242,242 | B2 * | 1/2016 | Hilgendorff | B01J 35/40 |
| 9,540,980 | B2 * | 1/2017 | Hilgendorff | F01N 3/0814 |
| 9,610,564 | B2 | 4/2017 | Xue et al. | |
| 11,260,372 | B2 * | 3/2022 | Xue | B01J 23/58 |
| 11,904,299 | B2 * | 2/2024 | Zheng | B01D 53/9422 |
| 2014/0205523 | A1 | 7/2014 | Arnold et al. | |
| 2015/0266014 | A1 * | 9/2015 | Xue | B01D 53/945 502/328 |
| 2015/0352493 | A1 * | 12/2015 | Zhang | B01J 37/038 423/213.5 |
| 2017/0320048 | A1 * | 11/2017 | Xue | B01J 21/066 |
| 2019/0388838 | A1 * | 12/2019 | Luo | B01J 35/393 |
| 2020/0290022 | A1 | 9/2020 | Zheng et al. | |
| 2022/0161236 | A1 * | 5/2022 | Vjunov | B01J 37/088 |
| 2023/0338938 | A1 * | 10/2023 | Vjunov | B01J 37/0236 |

OTHER PUBLICATIONS

European Search Report for EP Patent Application No. 20200951.0, Issued on Apr. 8, 2021, 4 pages.
International Search Report for PCT Patent Application No. PCT/EP2021/076195, Issued on Dec. 6, 2021, 4 pages.

* cited by examiner

THREE-WAY CONVERSION CATALYST COMPOSITION COMPRISING PLATINUM-RHODIUM BIMETALLIC COMPONENTS

FIELD OF THE INVENTION

The presently claimed invention relates to a catalyst composition useful for the treatment of exhaust gases to reduce contaminants contained therein. Particularly, the presently claimed invention relates to a catalyst composition suitable for three-way conversion catalysts and a catalytic article containing the respective catalyst composition.

BACKGROUND OF THE INVENTION

Three-way conversion (TWC) catalysts are well known for their catalytic activity of reducing pollutants such as NO, CO and HC using platinum group metals. A conventional TWC catalyst uses Pd and Rh as active catalytic components. Considering, the current PGM market price, replacing a part of more expensive Pd with less expensive Pt in a TWC catalyst would help catalytic article manufacturer and automobile manufacturer to reduce the significant cost. However, Platinum is thermally much less stable compared to Palladium and therefore poses a great challenge for TWC applications that must endure a severe aging treatment. Accordingly, it is desired to provide a TWC catalyst which can not only address the issues related to stability of PGM but also improve the cold-start performance.

OBJECT OF THE INVENTION

The object of the present invention is to provide a catalyst which can provide improved cold-start performance.

The problem of cold-start is solved by the present invention by providing a TWC catalyst based on platinum-rhodium bimetallic components which shows a synergistic effect between Pt and Rh due to selection of appropriate support material/s. This synergistic effect results in a significant improvement in converting CO, NO and HC relative to their individual metals (Pt and Rh).

SUMMARY OF THE INVENTION

The Presently Claimed Invention Provides a Catalyst Composition Comprising:

a) platinum;

b) rhodium; and c) a ceria-alumina composite, a zirconia composite or a mixture thereof, wherein platinum is supported on the ceria-alumina composite, zirconia composite or mixture thereof in an amount of 0.1 to 10.0 wt. %, based on the total weight of the ceria-alumina composite and/or zirconia composite, wherein rhodium is supported on the ceria-alumina composite, zirconia composite or a mixture thereof in an amount of 0.1 to 10.0 wt. %, based on the total weight of the ceria-alumina composite and/or zirconia composite, wherein the amount $CeO_2$ in the ceria-alumina composite is 1.0 to 50 wt. %, based on the total weight of the ceria-alumina composite, wherein the amount of $ZrO_2$ in the zirconia composite is 50 to 99 wt. %, based on the total weight of the zirconia composite.

The present invention also provides a process for preparing a catalyst composition. The present invention further provides catalytic article comprising the catalyst composition according to the presently claimed invention deposited on a substrate and its preparation. The present invention still further provides an exhaust gas treatment system for internal combustion engines comprising a catalytic article according to the presently claimed invention.

BRIEF DESCRIPTION OF THE DRAWINGS

In order to provide an understanding of the embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

DETAILED DESCRIPTION

Figure 1:
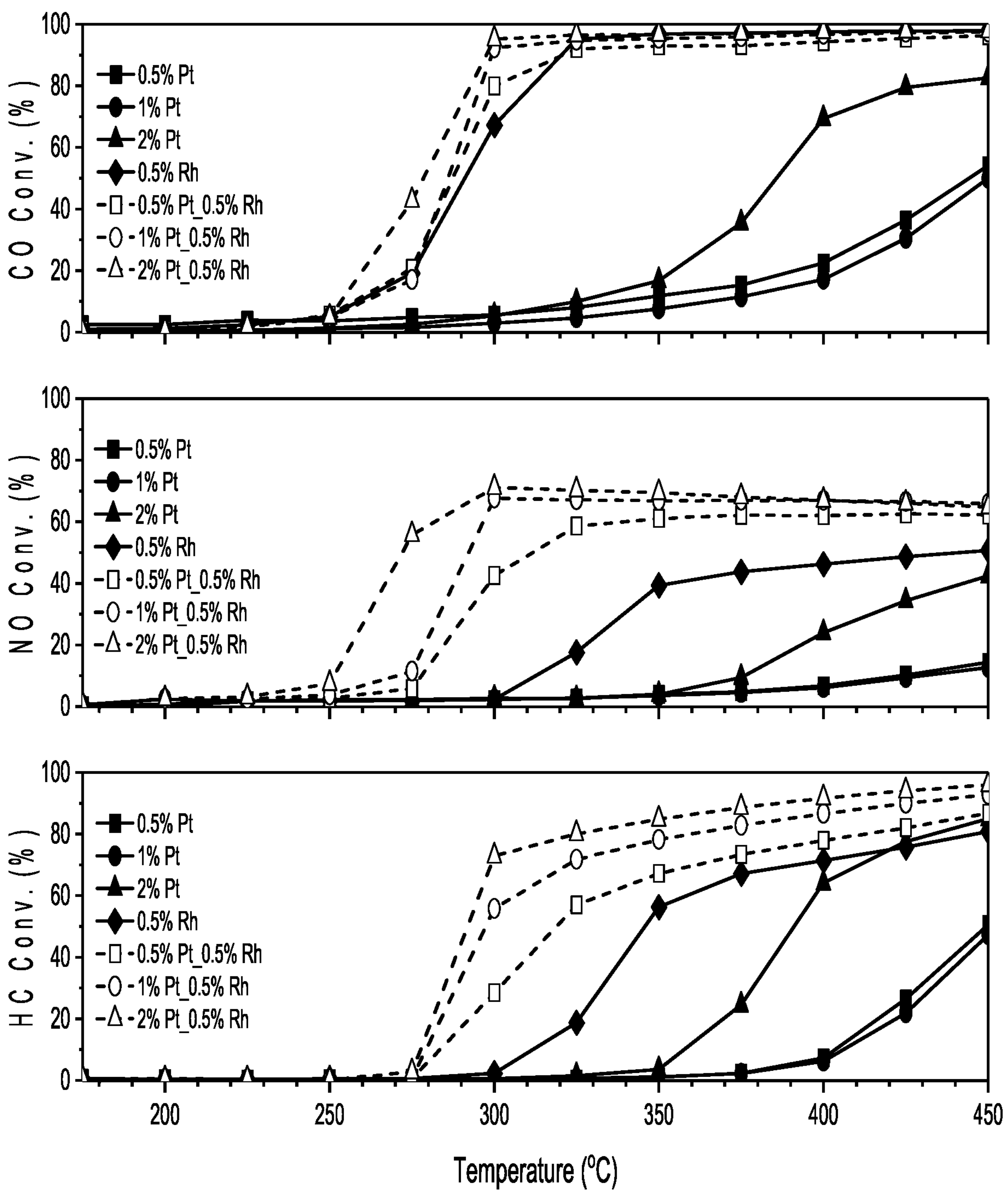
FIG. 1 illustrates light-off performance of Pt—Rh catalysts supported on $CeO_2/Al_2O_3$ for CO, NO and HC conversions.

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

Definitions

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

In the context of the present invention the term "first layer" is interchangeably used for "bottom layer" or "bottom coat" or "bottom washcoat", whereas the term "second layer" is interchangeably used for "top layer" or "top coat" or "top washcoat". The first layer is deposited at least on a part of the substrate and the second layer is deposited at least on a part of the first layer.

The term "three-way conversion catalyst" refers to a catalyst that simultaneously promotes a) reduction of nitrogen oxides to nitrogen and oxygen; b) oxidation of carbon monoxide to carbon dioxide; and c) oxidation of unburnt hydrocarbons to carbon dioxide and water.

The term "NOx" refers to nitrogen oxide compounds, such as NO and/or $NO_2$.

As used herein, the term "washcoat" has its usual meaning in the art of a thin, adherent coating of a catalytic or other material applied to a substrate material. Generally, a washcoat is formed by preparing a slurry containing a certain solid content (e.g., 15-60% by weight) of particles in a liquid vehicle, which is then coated onto a substrate and dried to provide a washcoat layer.

The term "oxygen storage component" (OSC) refers to an entity that has a multi-valence state and can actively react with reductants such as carbon monoxide (CO) and/or hydrogen under reduction conditions and then react with oxidants such as oxygen or nitrogen oxides under oxidative conditions.

OSC in the present context refers to ceria-zirconia which may be optionally stabilized by at least a rare earth element such as lanthanum, yttrium, neodymium, and praseodymium.

Hydrothermal stability of a catalyst may be functionally defined as retaining enough catalytic function after a high temperature aging. Specifically in this context, hydrothermal stability means that after an aging treatment at a temperature ranging from 950° C. to 1050° C. for about 5 hours with 10% steam a catalyst should have a $NO_x$ light-off temperature lower than 280° C. and a hydrocarbon light-off temperature lower than 290° C.

Platinum group metals, also referred to as "PGM" are ruthenium, rhodium, palladium, osmium, iridium, and platinum. The platinum group metal is preferably selected from platinum, rhodium, or mixture thereof.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "washcoat" has its usual meaning in the art of a thin, adherent coating of a catalytic or other material applied to a substrate material. Generally, a washcoat is formed by preparing a slurry containing a certain solid content (e.g., 15-60% by weight) of particles in a liquid vehicle, which is then coated onto a substrate and dried to provide a washcoat layer.

Catalyst Composition According to the Invention:

According to the Present Invention, there is Provided a Catalyst Composition Comprising:

a) platinum;

b) rhodium; and c) a ceria-alumina composite, a zirconia composite or a mixture thereof, wherein platinum is supported on the ceria-alumina composite, zirconia composite or a mixture thereof in an amount of 0.1 to 10.0 wt. %, based on the total weight of the ceria-alumina composite and/or zirconia composite, wherein rhodium is supported on the ceria-alumina composite, zirconia composite or a mixture thereof in an amount of 0.1 to 10.0 wt. %, based on the total weight of the ceria-alumina composite and/or zirconia composite, wherein the amount of $CeO_2$ in the ceria-alumina composite is 1.0 to 50 wt. %, based on the total weight of the ceria-alumina composite, wherein the amount of $ZrO_2$ in the zirconia composite is 50 to 99 wt. %, based on the total weight of the zirconia composite.

The term "catalyst composition" refers to a composition comprising at least one catalytically active metal and at least one support. The catalytically active metal is deposited on the support. The catalyst composition may comprise other constituents like stabilizers, promoters and/or binders which are also deposited on the support. The catalytically active metal is preferably selected from PGM and more preferably from platinum, rhodium or mixtures thereof.

The terms "deposited" and "supported" are used interchangeably. Deposition of the catalytically active metal on the support can be achieved by various methods known to the person skilled in the art. These include coating techniques, impregnation techniques like incipient wetness impregnation, precipitation techniques as well as atomic deposition techniques like chemical vapour deposition. In these techniques a suitable precursor comprising the catalytically active metal is brought into contact with the support and thereby undergoes chemical or physical bonding with the support. The precursor comprising the catalytically active metal is thus deposited on the support. Upon interaction with the support, the precursor comprising the catalytically active metal may be transformed to another species comprising the catalytically active metal. To increase the chemical or physical bonding of the deposited species with the support different treatment steps like chemical fixing and/or thermal fixing can be performed.

The term "thermal fixing" refers to deposition of the catalytically active metal onto the respective support, e.g. via incipient wetness impregnation method, followed by the thermal calcination of the resulting catalytically active metal/support mixture. In one embodiment, the mixture is calcined for 1.0 to 3.0 hours at 400-700° C. with a ramp rate of 1-25° C./min.

The term "chemical fixing" refers to deposition of the catalytically active metal onto the respective support followed by a fixation using an additional reagent such as Ba-hydroxide or acetic acid, depending on the nature of the metal precursor, to chemically link the precursor with the support material. As a result, catalytically active metal is chemically fixed as an insoluble component in the pores and on the surface of the support.

The term "incipient wetness impregnation" also known as capillary impregnation or dry impregnation refers to dissolving a precursor of the catalytically active metal into an aqueous or organic solution and adding the resultant catalytically active metal containing solution to support. The capillary action draws the solution into the pores of the support. The composition obtained is dried and calcined to remove the volatile components within the solution, depositing the metal on the surface of the support.

The term "support" refers to a solid material on which the catalytically active metal(s) is/are deposited. The support may be inert or also participate in the catalytic reaction. Preferably the support has a high BET surface area, which it maintains under the reaction conditions, and is mechanically stable. "BET surface area" has its usual meaning of referring to the Brunauer, Emmett, Teller method for determining the surface area by $N_2$ adsorption.

Supports of the present invention are ceria-alumina composite, zirconia composite and mixtures of ceria-alumina composites and zirconia composites. The total amount of ceria-alumina composite and zirconia composite is 10 to 90 wt. % based on the total weight of the catalyst composition.

Ceria-Alumina Composite:

Ceria-alumina composite, also referred to as ceria-doped alumina is a composite in which $CeO_2$ is distributed on the surface of alumina or in the bulk as particles, nano clusters or even single atoms. In one embodiment, the composite is mixed oxide in which each oxide has its distinct chemical and physical state, however, the oxides can interact through their interface. Any physical state of $CeO_2$ or the combination of the states can exist or coexist on the surface of alumina or in the bulk. The surface $CeO_2$ modification of alumina can in the form of discrete moieties (particles or clusters) or forms a layer of ceria that covers the surface of alumina partially or completely.

The amount of $CeO_2$ (cerium oxide) in the ceria-alumina composite is 1.0 to 50 wt. %, based on the total weight of the ceria-alumina composite. Preferably, the amount of $CeO_2$ in the ceria-alumina composite is 5.0 to 50 wt. %, based on the total weight of the ceria-alumina composite More preferably, the amount of $CeO_2$ in the ceria-alumina composite is 10 to 40 wt. %, based on the total weight of the ceria-alumina composite. Even more preferably, the amount of $CeO_2$ in the ceria-alumina composite is 10 to 30 wt. %, based on the total weight of the ceria-alumina composite. Most preferably, the amount of $CeO_2$ in the ceria-alumina composite is 15 to 35 wt. %, based on the total weight of the ceria-alumina composite. Even most preferably, the amount of $CeO_2$ in the ceria-alumina composite is 20 to 30 wt. %, based on the total weight of the ceria-alumina composite.

The amount of $Al_2O_3$ (aluminium oxide) in the ceria-alumina composite is 50 to 99 wt. % based on the total weight of the ceria-alumina composite. Preferably, the amount of $Al_2O_3$ in the ceria-alumina composite is 50 to 95 wt. % based on the total weight of the ceria-alumina composite. More preferably, the amount of $Al_2O_3$ in the ceria-alumina composite is 70 to 90 wt. % based on the total weight of the ceria-alumina composite.

The average particle size of ceria in the ceria-alumina composite is less than 50 nm. Preferably, the average particle size of ceria in the ceria-alumina composite is less than 20 nm. More preferably, the particles size is in the range of 5 nm to 20 nm. The particle size is determined by transition electron microscopy.

The ceria-alumina composite further comprise a dopant selected from zirconia, lanthana, titania, hafnia, magnesia, calcia, strontian, baria or any combination thereof. The dopant is incorporated into the lattice structure of the ceria-alumina composite. The total amount of dopant in the ceria-alumina is preferably in the range of 0.001 to 15 wt. % based on the total weight of the ceria-alumina composite. More preferably, the total amount of dopant in the ceria-alumina is in the range of 0.01 to 10 wt. % based on the total weight of the ceria-alumina composite. Even more preferably, the total amount of dopant in the ceria-alumina is in the range of 0.01 to 5.0 wt. % based on the total weight of the ceria-alumina composite.

The ceria-alumina composite can be made by methods known to the person skilled in the art like co-precipitation or surface modification. In these methods, a suitable cerium containing precursor is brought into contact with a suitable aluminium containing precursor and the so obtained mixture is then transformed into the ceria-alumina composite. Suitable cerium containing precursors are for example water soluble cerium salts and colloidal ceria suspension. Ceria-alumina can also be prepared by the atomic layer deposition method, where a ceria compound selectively reacts with alumina surface, which after calcination forms ceria on the alumina surface. This deposition/calcination step can be repeated until a layer of desired thickness is reached. Suitable aluminium containing precursors are for example aluminium oxides like gamma alumina, delta alumina or theta alumina or their combinations. Transformation of the so obtained mixture into the ceria-alumina composite can then be achieved by a calcinations step of the mixture.

Zirconia Composite:

The zirconia composite is a $ZrO_2$ containing solid solution which may form a single phase as detected by XRD. The amount of $ZrO_2$ (zirconium oxide) in the zirconia composite is 50 to 99 wt. % based on the total weight of the zirconia composite. Preferably, the zirconia composite comprises one or more rare earth metals in their oxidic form. The rare earth metals are incorporated in their oxidic form into the lattice structure of the zirconia composite. The rare earth metals are preferably selected from lanthanum, praseodymium, yttrium, neodymium and mixture thereof. Preferably, the amount of rare earth metals in oxidic form in the zirconia composite is 1.0 to 15 wt. % based on the total weight of the zirconia composite. More preferably, the amount of rare earth metals in oxidic form in the zirconia composite is 5.0 to 15 wt. % based on the total weight of the zirconia composite. Some rare earth metal doped $ZrO_2$ composite may experience a slight phase separation after a high temperature (>1000° C.) aging.

Most preferably, the zirconia composite comprises 85 to 99 wt. % $ZrO_2$ and 1.0 to 15 wt. % of $La_2O_3$, each based on the total weight of the zirconia composite. Preferably, the amount of $CeO_2$ in the zirconia composite is less than 0.001 wt. % based on the total weight of the zirconia composite.

The zirconia composite may comprise other dopants selected from, alumina titania, hafnia, magnesia, calcia, strontian, baria or any combination thereof. The total amount of dopant in the zirconia is preferably in the range of 0.001 to 15 wt. % based on the total weight of the zirconia composite.

The zirconia composite can be made by methods known to the person skilled in the art like co-precipitation or surface modification.

Mixture of Ceria-Alumina Composite and Zirconia Composite:

Mixture of ceria-alumina composite and zirconia composite refer to physical mixture of the components. These mixtures can be prepared by methods known to the person skilled in the art. The mixture can be prepared before or after platinum and/or rhodium are deposited on the ceria-alumina composite and/or the zirconia-composite.

Preferably, the weight proportion of ceria-alumina composite to zirconia composite in the mixture is 1:4 to 4:1. More preferably, the weight proportion of ceria-alumina to zirconia composite in the mixture is 1:1. For sake of clarification, to determine the weight proportion, the amount of platinum and/or rhodium possibly supported on the respective composites is not taken into account.

The total amount of the ceria-alumina composite and/or zirconia composite in the catalyst composition is 10 to 90 wt. %, based on the total weight of the catalyst composition.

Platinum Group Metals:

In the present invention, the catalytically active metals supported on the ceria-alumina composite, on the zirconia composite or on the mixture of both are platinum and rhodium. Other PGM may also be supported in addition to platinum and rhodium on the respective supports. The total amount of platinum in the catalyst composition is in the range of 0.1 to 10 wt. %, based on the total weight of the catalyst support. Preferably, the total amount of platinum in the catalyst composition is in the range of 0.1 to 5.0 wt. %, based on the total weight of the catalyst support. More preferably, the total amount of platinum in the catalyst composition is in the range of 0.1 to 3.0 wt. %, based on the total weight of the catalyst support The total amount of rhodium in the catalyst composition is in the range of 0.1 to 10 wt. %, based on the total weight of the catalyst support. Preferably, the total amount of rhodium in the catalyst composition is in the range of 0.1 to 5.0 wt. %, based on the total weight of the catalyst support. More preferably, the total amount of rhodium in the catalyst composition is in the range of 0.1 to 3.0 wt. %, based on the total weight of the catalyst support.

Preferably, no additional PGM metal such as palladium is present in the catalyst composition of the present invention. i.e. the catalyst composition of the present invention is essentially free of palladium. The term essentially free refers to presence of palladium as an impurity which amount for less than 0.01, preferably 0.001%.

Alternatively, an additional PGM metal such as palladium may be optionally present in the catalyst composition of the present invention.

Preferably, platinum is supported on the ceria-alumina composite, on the zirconia composite or on the mixture of both. Preferably, the total amount of platinum supported on the ceria-alumina composite and/or the zirconia composite is 0.1 to 10 wt. % based on the total weight of the ceria-alumina composite and/or the zirconia composite. More preferably, platinum is supported on the ceria-alumina composite, on the zirconia composite or on the mixture of both in an amount of 0.5 to 2.0 wt. %, based on the total weight of the zirconia composite and/or ceria-alumina composite.

Preferably, rhodium is supported on the ceria-alumina composite, on the zirconia composite or on the mixture of both. Preferably, the total amount of rhodium supported on the ceria-alumina composite, and/or the zirconia composite is 0.1 to 10 wt. %, based on the total weight of the ceria-alumina composite and/or the zirconia composite. More preferably, rhodium is supported on the ceria-alumina composite, on the zirconia composite or on the mixture of both in an amount of 0.5 to 2.0 wt. %, based on the total weight of the zirconia composite and/or ceria-alumina composite.

More preferably, platinum is supported on the ceria-alumina composite in an amount of 0.1 to 10 wt. % based on the total weight of the ceria-alumina composite and rhodium is supported on the zirconia composite in an amount of 0.1 to 10 wt. %, based on the total weight of the zirconia composite; or platinum is supported on the zirconia composite in an amount of 0.1 to 10 wt. % based on the total weight of the zirconia composite and rhodium is supported on the ceria-alumina composite in an amount of 0.1 to 10 wt. %, based on the total weight of the ceria-alumina composite; or platinum is supported on the zirconia composite and on the ceria-alumina composite in an amount of 0.1 to 10 wt. %, based on the total weight of the zirconia composite and ceria-alumina composite and rhodium is supported on the zirconia composite in an amount of 0.1 to 10 wt. % based on the total weight of the zirconia composite; or platinum is supported on the zirconia composite and on the ceria-alumina composite in an amount of 0.1 to 10 wt. %, based on the total weight of the zirconia composite and ceria-alumina composite and rhodium is supported on the ceria-alumina composite in an amount of 0.1 to 10 wt. %, based on the total weight of the ceria-alumina composite; or platinum is supported on the ceria-alumina composite in amount of 0.1 to 10 wt. %, based on the total weight of the ceria-alumina composite and rhodium is supported on the zirconia composite and on the ceria-alumina composite in an amount of 0.1 to 10 wt. %, based on the total weight of the zirconia composite and on the ceria-alumina composite; or platinum is supported on the zirconia composite in amount of 0.1 to 10 wt. %, based on the total weight of the zirconia composite and, rhodium is supported on the zirconia composite and on the ceria-alumina composite in amount of 0.1 to 10 wt. %, based on the total weight of zirconia composite and the ceria-alumina composite; or platinum is supported on the zirconia composite and on the ceria-alumina composite in an amount of 0.1 to 10 wt. %, based on the total weight of the zirconia composite and ceria-alumina composite and rhodium is supported on the ceria-alumina composite and the zirconia composite in a total amount of 0.1 to 10 wt. %, based on the total weight of the ceria-alumina composite and zirconia composite; or platinum and rhodium are supported on a mixture of the ceria-alumina composite and the zirconia composite. Preferably, the weight proportion of ceria-alumina composite to zirconia composite in the mixture is 1:4 to 4:1. More preferably, the weight proportion of ceria-alumina to zirconia composite in the mixture is 1:1.

The invention is further described by the following embodiments. The features of each of the embodiments are combinable with any of the other embodiments where appropriate and practical.

Embodiment 1

The Catalyst Composition Comprising:

a) platinum;

b) rhodium; and c) a ceria-alumina composite, a zirconia composite, or a mixture thereof, wherein platinum is supported on the ceria-alumina composite, zirconia composite or a mixture thereof in an amount of 0.1 to 10.0 wt. %, based on the total weight of the ceria-alumina composite and/or zirconia composite, wherein rhodium is supported on the ceria-alumina composite, zirconia composite or a mixture thereof in an amount of 0.1 to 10.0 wt. %, based on the total weight of the ceria-alumina composite and/or zirconia composite, wherein the amount of $CeO_2$ in the ceria-alumina composite is 5.0 to 50 wt. %, based on the total weight of the ceria-alumina composite, wherein the amount of $ZrO_2$ in the zirconia composite is 50 to 99 wt. %, based on the total weight of the zirconia composite.

Embodiment 2

The catalyst composition according to any of the preceding or subsequent embodiment, wherein the amount of $CeO_2$ in the zirconia composite is <0.001 wt. % based on the total weight of the zirconia composite.

Embodiment 3

The catalyst composition according to any of the preceding or subsequent embodiment, wherein platinum is supported on the ceria-alumina composite and rhodium is supported on the zirconia composite.

Embodiment 4

The catalyst composition according to any of the preceding or subsequent embodiment, wherein platinum is supported on the zirconia composite and rhodium is supported on the ceria-alumina composite.

Embodiment 5

The catalyst composition according to any of the preceding or subsequent embodiment, wherein platinum and rhodium are supported on a mixture of the ceria-alumina composite and zirconia composite.

Embodiment 6

The catalyst composition according to any of the preceding or subsequent embodiment wherein the catalyst composition comprising:

a) platinum;

b) rhodium; and c) a mixture of ceria-alumina composite and zirconia composite, wherein platinum and rhodium are supported on the mixture of ceria-alumina composite and zirconia composite, wherein the amount platinum is 0.1 to 5.0 wt. %, based on the total weight of the mixture of ceria-alumina composite and zirconia composite, wherein the amount rhodium is 0.1 to 5.0 wt. %, based on the total weight of the mixture of ceria-alumina composite and zirconia composite, wherein the amount of $CeO_2$ in the ceria-alumina composite is 5.0 to 50 wt. %, based on the total weight of the ceria-alumina composite, wherein the amount of $ZrO_2$ in the zirconia composite is 50 to 99 wt. %, based on the total weight of the zirconia composite.

Embodiment 7

The catalyst composition according to any of the preceding or subsequent embodiment/s, wherein the weight proportion of the ceria-alumina composite to the zirconia composite in the mixture of the ceria-alumina composite and zirconia composite is 1:4 to 4:1.

Embodiment 8

The catalyst composition according to any of the preceding or subsequent embodiment, wherein the weight proportion of the ceria-alumina composite to the zirconia composite in the mixture of the ceria-alumina composite and zirconia composite is 1:1.

Embodiment 9

The catalyst composition according to any of the preceding or subsequent embodiment, wherein the zirconia composite comprises 85 wt. % or more $ZrO_2$ and 15 wt. % or less rare earth metal(s) in oxide form, based on total weight of the zirconia composite.

Embodiment 10

The catalyst composition according to any of the preceding or subsequent embodiment, wherein the rare earth metal in oxide form is selected from oxides of lanthanum, praseodymium, yttrium, neodymium, and any combination thereof.

Embodiment 11

The catalyst composition according to any of the preceding or subsequent embodiment, wherein the zirconia composite comprises 85 to 95 wt. % of $ZrO_2$ and 5.0 to 15 wt. % of lanthanum oxide, based on the total weight of the zirconia composite.

Embodiment 12

The catalyst composition according to any of the preceding or subsequent embodiment, wherein the ceria-alumina composite is characterized by the average ceria particle size less than 50 nm measured by transmission electron microscopy.

Embodiment 13

The catalyst composition according to any of the preceding or subsequent embodiment, wherein the ceria-alumina composite is characterized by the average ceria particle size less than 20 nm measured by transmission electron microscopy.

Embodiment 14

The catalyst composition according to any of the preceding or subsequent embodiment, wherein the ceria-alumina composite is characterized by the average ceria particle size less than 10 nm measured by transmission electron microscopy.

Embodiment 15

The catalyst composition according to any of the preceding or subsequent embodiment, wherein the ceria-alumina composite is characterized by the average ceria particle size of 1.0 to 10 nm measured by transmission electron microscopy.

Embodiment 16

The catalyst composition according to any of the preceding or subsequent embodiment, wherein the total amount of the ceria-alumina composite and/or zirconia composite is 10 to 90 wt. %, based on the total weight of the catalyst composition.

Embodiment 16

The catalyst composition according to any of the preceding or subsequent embodiment, wherein the amount of $CeO_2$ in the ceria-alumina composite is 10 to 40 wt. %, based on the total weight of the ceria-alumina composite.

Embodiment 17

The catalyst composition according to any of the preceding or subsequent embodiment, wherein the amount of $CeO_2$ in the ceria-alumina composite is 15 to 35 wt. %, based on the total weight of the ceria-alumina composite.

Embodiment 18

The catalyst composition of any preceding or subsequent embodiment, wherein the amount of $CeO_2$ in the ceria-alumina composite is 20 to 30 wt. %, based on the total weight of the ceria-alumina composite.

Preparation of Catalyst Composition:

The present invention also provides a process for making the catalyst composition according to the present invention, wherein the process comprises:

i) impregnation of platinum on a ceria-alumina composite, a zirconia composite, or a mixture thereof to obtain a first mixture;

ii) impregnation of rhodium on a ceria-alumina composite, a zirconia composite, or a mixture thereof to obtain a second mixture; and iii) mixing the first mixture and the second mixture to obtain the catalyst composition.

Alternatively, the process for making the catalyst composition comprises sequential impregnation of rhodium and platinum on a mixture of ceria-alumina composite and zirconia composite to obtain the catalyst composition.

The presently claimed invention also provides a catalytic article comprising the catalyst composition according to the presently claimed invention deposited on a substrate.

Preferably, the catalytic article is a single layered catalytic article or bi-layered and has hydrothermal stability at an aging temperature of in the range of 950° C. to 1050° C.

The a bi-layered article comprises a) a first layer; b) a second layer and c) substrate.

First Layer (Bottom Coat)

The bottom coat is deposited on the substrate. Preferably, the bottom coat covers 90 to 100% of the surface of the substrate. More preferably, the bottom coat covers 95 to 100% of the surface of the substrate and even more preferably, the bottom coat covers the whole accessible surface of the substrate. The term "accessible surface" refers to the surface of the substrate which can be covered with the conventional coating techniques used in the field of catalyst preparation like impregnation techniques.

Preferably, the first layer comprises platinum supported on a ceria-alumina composite, zirconia composite or a mixture thereof. The amount of platinum in the first layer is 0.1 to 10 wt. % based on the total weight of the first layer. Preferably, the amount of platinum in the first layer is 0.3 to 5.0 wt. %, based on the total weight of the first layer.

Alternatively, the first layer comprises rhodium supported on a ceria-alumina composite, a zirconia composite, or a mixture thereof. Preferably, the amount of rhodium in the first layer is 0.1 to 10 wt. %, based on the total weight of the first layer. More preferably, the amount of rhodium in the first layer is 0.1 to 1.0 wt. %, based on the total weight of the first layer.

The amount of $CeO_2$ in the ceria-alumina composite is 5.0 to 50 wt. %, based on the total weight of the ceria-alumina composite. The amount of $ZrO_2$ in the zirconia composite is 50 to 99 wt. %, based on the total weight of the zirconia composite.

Second Layer (Top Coat)

The top coat is deposited on the bottom coat. Preferably, the top coat covers 90 to 100% of the surface of the bottom coat. More preferably, the top coat covers 95 to 100% of the surface of the substrate and even more preferably, the top coat covers the whole accessible surface of the bottom coat.

Preferably, the second layer comprises rhodium supported on a ceria-alumina composite, a zirconia composite, or a mixture thereof.

Preferably, the amount of rhodium in the second layer is 0.1 to 10 wt. %, based on the total weight of the second layer. More preferably, the amount of rhodium in the second layer is 0.1 to 1.0 wt. %, based on the total weight of the second layer.

Alternatively, the second layer comprises platinum supported on a ceria-alumina composite, zirconia composite or a mixture thereof. The amount of platinum in the second layer is 0.1 to 10 wt. % based on the total weight of the second layer. Preferably, the amount of platinum in the second layer is 0.3 to 5.0 wt. %, based on the total weight of the second layer.

The amount of $CeO_2$ in the ceria-alumina composite is 5.0 to 50 wt. %, based on the total weight of the ceria-alumina composite. The amount of $ZrO_2$ in the zirconia composite is 50 to 99 wt. %, based on the total weight of the zirconia composite.

More preferably, platinum and rhodium are supported on a mixture of the ceria-alumina composite and the zirconia composite. Preferably, the weight proportion of ceria-alumina composite to zirconia composite in the mixture is 1:4 to 4:1. More preferably, the weight proportion of ceria-alumina to zirconia composite in the mixture is 1:1.

Preferably, platinum and/or rhodium is thermally or chemically fixed on the ceria-alumina composite, zirconia composite or mixture thereof.

The catalytic article further comprises an oxygen storage component in the first and/or the second layer. Preferably, the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof.

Zoned Configuration:

The catalytic article such as single layered or bi-layered may have a zoned configuration comprising a first zone and second zone. In a bi-layered catalytic article, the first layer and/or the second layer comprises a first zone and a second zone. Preferably, the first zone and the second zone together cover 50 to 100% of length of the substrate. More preferably, the first and second zone together cover 90 to 100% of the length of the substrate and even more preferably, the first and the second zone together cover the whole length of the substrate. Preferably, the first zone covers 10 to 90% of the entire substrate length from an inlet and the second zone covers 90 to 10% of the entire substrate length from an outlet, while the first zone and the second zone together cover 20 to 100% of the length of the substrate. More preferably, the first zone covers 30 to 70% of the entire substrate length from the inlet and the second zone covers 70 to 30% of the entire substrate length from the outlet, while the first zone and the second zone together cover 60 to 100% of the length of the substrate. Even more preferably, the first zone covers 40 to 60% of the entire substrate length from the inlet and the second zone covers 60 to 40% of the entire substrate length from the outlet, while the first zone and the second zone together cover 80 to 100% of the length of the substrate.

Preferably, the first and/or the second zone comprises platinum supported on a ceria-alumina composite, zirconia composite or a mixture thereof. The amount of platinum in the first layer is 0.1 to 10 wt. % based on the total weight of the first layer. Preferably, the amount of platinum in the first layer is 0.3 to 5.0 wt. %, based on the total weight of the first layer. Alternatively, the first zone and/or the second zone comprises rhodium supported on a ceria-alumina composite, a zirconia composite, or a mixture thereof. Preferably, the amount of rhodium in the first layer is 0.1 to 10 wt. %, based on the total weight of the first layer. More preferably, the amount of rhodium in the first layer is 0.1 to 1.0 wt. %, based on the total weight of the first layer. The amount of $CeO_2$ in the ceria-alumina composite is 5.0 to 50 wt. %, based on the total weight of the ceria-alumina composite. The amount of $ZrO_2$ in the zirconia composite is 50 to 99 wt. %, based on the total weight of the zirconia composite.

More preferably, platinum and rhodium are supported on a mixture of the ceria-alumina composite and the zirconia composite. Preferably, the weight proportion of ceria-alumina composite to zirconia composite in the mixture is 1:4 to 4:1. More preferably, the weight proportion of ceria-alumina to zirconia composite in the mixture is 1:1.

Substrate:

The substrate of the catalytic article of the presently claimed invention may be constructed of any material typically used for preparing automotive catalysts. In one embodiment, the substrate is a ceramic substrate, metal substrate, ceramic foam substrate, polymer foam substrate or a woven fiber substrate. In one embodiment, the substrate is a ceramic or a metal monolithic honeycomb structure.

The substrate provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8% of aluminium, and up to 20 wt. % of nickel. The alloys may also contain small or trace amounts of one or more metals such as manganese, copper, vanadium, titanium, and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates, and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 900 cpsi. The wall thickness of flow-through substrates can vary, with a typical range being between 0.002 and 0.1 inches. A representative commercially available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

Figure 9A:
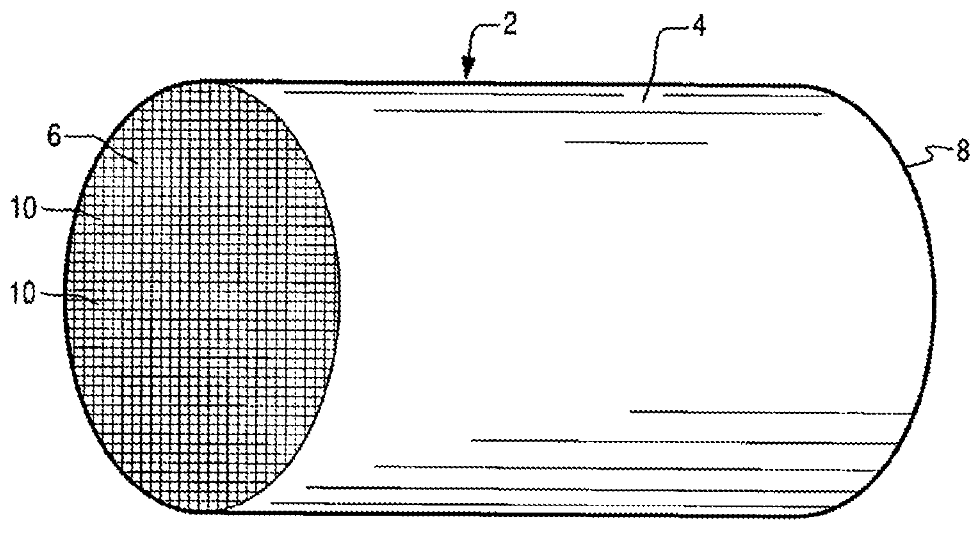
FIG. 9A is a perspective view of a honeycomb-type substrate carrier which may comprise the catalyst composition in accordance with one embodiment of the presently claimed invention.
Figure 9B:
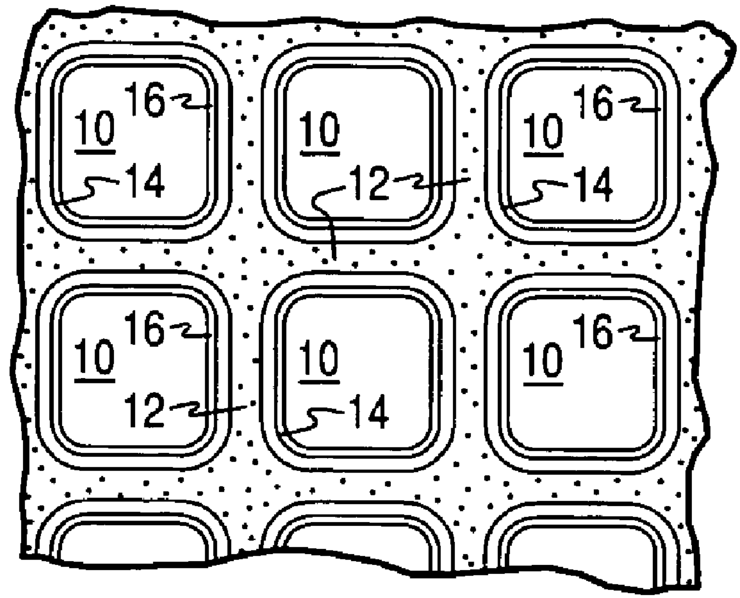
FIG. 9B is a partial cross-section view enlarged relative to FIG. 9A and taken along a plane parallel to the end faces of the substrate carrier of FIG. 9A, which shows an enlarged view of a plurality of the gas flow passages shown in FIG. 9A.

FIGS. 9A and 9B illustrate an exemplary substrate 2 in the form of a flow-through substrate coated with washcoat compositions as described herein. Referring to FIG. 9A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 9B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 9B, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 10:
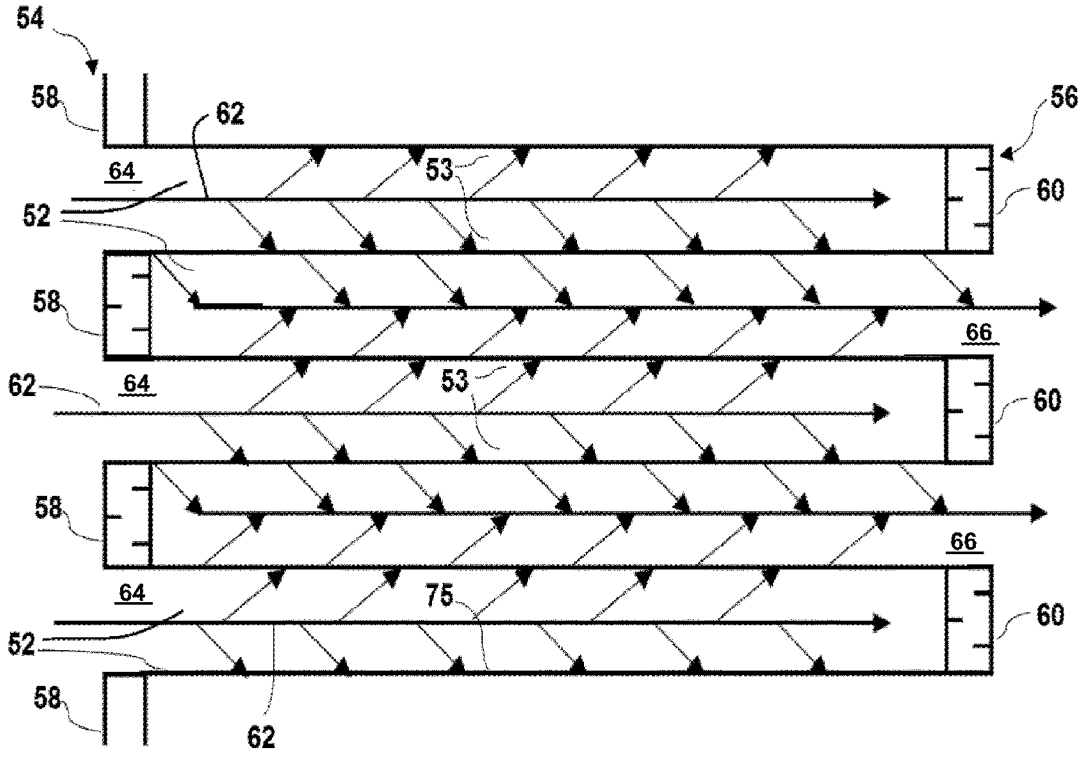
FIG. 10 is a cutaway view of a section enlarged relative to FIG. 9A, wherein the honeycomb-type substrate in FIG. 9A represents a wall flow filter substrate monolith.

FIG. 10 illustrates an exemplary substrate 2 in the form of a wall flow filter substrate coated with a washcoat composition as described herein. As seen in FIG. 10, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

Preparation of Catalytic Article:

In another aspect of the present invention, there is also provided a process for the preparation of the catalytic article described herein above. The process comprises the following steps. Initially, a slurry comprising platinum supported on a ceria-alumina composite, a zirconia composite, or a mixture thereof and rhodium supported on a ceria doped alumina, a zirconia composite, or a mixture thereof is prepared. In the next step, the prepared slurry is deposited on a substrate to obtain a catalytic article followed by calcination at a temperature ranging from 400 to 700° C. The step of preparing the slurry comprises a technique selected from incipient wetness impregnation, incipient wetness co-impregnation, and post-addition.

Preferably, the process for the preparation of a catalytic article comprises:

preparing a slurry comprising platinum and rhodium supported on a mixture of a ceria-alumina composite and a zirconia composite;

depositing the slurry on a substrate to obtain a catalytic article followed by calcination at a temperature ranging from 400 to 700° C., wherein the step of preparing the slurry comprises a technique selected from incipient wetness impregnation, incipient wetness co-impregnation, and post-addition.

The process may involve a pre-step of thermal or chemical fixing of platinum or rhodium or both on support/s.

Substrate Coating:

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1-5 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling is accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 3 to about 40 microns, preferably 10 to about 30 microns, more preferably about 10 to about 15 microns. The $D_{90}$ is determined using a dedicated particle size analyzer. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 min-3 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of about 850° C. to about 1050° C. in an environment of 10 vol. % water in an alternating hydrocarbon/air feed for 50-75 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at about 850° C. to about 1050° C., 10 vol. % water in an alternating hydrocarbon/air feed, 50-75 hours aging).

The catalytic article of the present invention is further described by the following embodiments. The features of each of the embodiments are combinable with any of the other embodiments where appropriate and practical.

Embodiment 19

The Catalytic Article Comprises:

A. a catalyst composition comprising:
 a) platinum;
 b) rhodium; and
 c) a ceria-alumina composite, a zirconia composite or a mixture thereof,
  wherein platinum is supported on the ceria-alumina composite, zirconia composite or a mixture thereof in an amount of 0.1 to 10.0 wt. %, based on the total weight of the ceria-alumina composite and/or zirconia composite,
  wherein rhodium is supported on the ceria-alumina composite, zirconia composite or a mixture thereof in an amount of 0.1 to 10.0 wt. %, based on the total weight of the ceria-alumina composite and/or zirconia composite,
  wherein the amount of $CeO_2$ in the ceria-alumina composite is 5.0 to 50 wt. %, based on the total weight of the ceria-alumina composite,
  wherein the amount of $ZrO_2$ in the zirconia composite is 50 to 99 wt. %, based on the total weight of the zirconia composite, and B. a substrate.

Embodiment 20

The catalytic article according to any of the preceding or subsequent embodiment, wherein the catalytic article is a single layered catalytic article and has hydrothermal stability at an aging temperature in the range of 950° C. to 1050° C.

Embodiment 21

The catalytic article according to any of the preceding or subsequent embodiment, wherein the catalytic article is a bi-layered article comprising:

a) a first layer,
b) a second layer, and
c) a substrate,
 wherein the first layer comprises platinum supported on a ceria-alumina composite, zirconia composite or a mixture thereof,
 wherein the second layer comprises rhodium supported on a ceria-alumina composite, a zirconia composite or a mixture thereof,
 wherein the first layer is deposited at least partially on the substrate and the second layer is at least partially deposited on the first layer,
 wherein the amount of $CeO_2$ in the ceria-alumina composite is 5.0 to 50 wt. %, based on the total weight of the ceria-alumina composite,
 wherein the amount of $ZrO_2$ in the zirconia composite is 50 to 99 wt. %, based on the total weight of the zirconia composite,
 wherein the amount of platinum in the first layer is 0.3 to 5.0 wt. %, based on the total weight of the first layer,
 wherein the amount of rhodium in the second layer tis 0.1 to 1.0 wt. %, based on the total weight of the second layer.

Embodiment 22

The catalytic article according to any of the preceding or subsequent embodiment, wherein the catalytic article is a bi-layered article comprising:

a) a first layer,
b) a second layer, and
c) a substrate,
 wherein the first layer comprises rhodium supported on a ceria-alumina composite, a zirconia composite or a mixture thereof,
 wherein the second layer comprises platinum supported on a ceria-alumina composite, a zirconia composite or a combination thereof,
 wherein the first layer is deposited at least partially on the substrate and the second layer is deposited at least partially on the first layer, wherein the amount of $CeO_2$ in the ceria-alumina composite is 5.0 to 50 wt. %, based on the total weight of the ceria-alumina composite,
 wherein the amount of $ZrO_2$ in the zirconia composite is 50 to 99 wt. %, based on the total weight of the zirconia composite,
 wherein the amount of platinum in the second layer is 0.3 to 5.0 wt. %, based on the total weight of the second layer,
 wherein the amount of rhodium in the first layer is 0.1 to 1.0 wt. %, based on the total weight of the first layer.

Embodiment 23

The catalytic article according to any of the preceding or subsequent embodiment, wherein the catalytic article has a zoned configuration comprising a first zone and second zone.

Embodiment 24

The catalytic article according to any of the preceding or subsequent embodiment, wherein the catalytic article further comprises an oxygen storage component, the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof.

Embodiment 25

The catalytic article according to any of the preceding or subsequent embodiment, wherein platinum and/or rhodium is thermally or chemically fixed on a ceria-alumina composite, a zirconia composite or a mixture thereof.

Emission Treatment System:

In another aspect of the present invention, there is also provided an exhaust gas treatment system for internal combustion engines, said system comprising the catalytic article described hereinabove. In one illustration, the system comprises a platinum group metal based three-way conversion (TWC) catalytic article and the catalytic article according to the presently claimed invention, wherein the platinum group metal based three-way conversion (TWC) catalytic article is positioned downstream from an internal combustion engine is in fluid communication with the engine out exhaust gas. The catalytic article of the invention can also be used as part of an integrated exhaust system comprising one or more additional components for the treatment of exhaust gas emissions.

For example, the exhaust system also known as emission treatment system may further comprise close coupled TWC catalyst, underfloor catalyst, catalysed soot filter (CSF) component, and/or a selective catalytic reduction (SCR) catalytic article. The preceding list of components is merely illustrative and should not be taken as limiting the scope of the invention. The catalytic article may be placed in a close-coupled position. Close-coupled catalysts are placed close to an engine to enable them to reach reaction temperatures as soon as possible. In general, the close-coupled catalyst is placed within three feet, more specifically, within one foot of the engine, and even more specifically, less than six inches from the engine. Close-coupled catalysts are often attached directly to the exhaust gas manifold. Due to their proximity to the engine, close-coupled catalysts are required to be stable at high temperatures.

In another aspect of the present invention, there is also provided a method of treating a gaseous exhaust stream comprising hydrocarbons, carbon monoxide, nitrogen oxide and particulates, the method comprising contacting said exhaust stream with the catalytic article, or the exhaust gas treatment system according to the presently claimed invention.

There is also provided a method of reducing hydrocarbons, carbon monoxide, and nitrogen oxide levels in a gaseous exhaust stream, the method comprising contacting the gaseous exhaust stream with the catalytic article or the exhaust gas treatment system according to the presently claimed invention to reduce the levels of hydrocarbons, carbon monoxide, and nitrogen oxide in the exhaust gas.

In another aspect of the present invention, there is also provided use of the catalytic article or the exhaust gas treatment system according to the presently claimed invention for purifying a gaseous exhaust stream comprising hydrocarbons, carbon monoxide, and nitrogen oxide.

Aspects of the presently claimed invention are more fully illustrated by the following examples, which are set forth to illustrate certain aspects of the present invention and are not to be construed as limiting thereof.

Example 1

Platinum Supported on Ceria-Alumina Composite ($CeO_2/Al_2O_3$)

Powder catalyst samples were prepared by impregnating Pt tetraamine hydroxide solution on $CeO_2/Al_2O_3$ using the incipient wetness technique. The $CeO_2/Al_2O_3$ contains 20% by weight $CeO_2$ and 80% by weight $Al_2O_3$. Before catalyst aging and testing, the catalyst powder was shaped according to the following procedures. Deionized water was added to the impregnated powder to make a slurry at about 30% solid. The pH of the slurry was adjusted to 4-4.5 using $HNO_3$. The slurry was dried under stirring and then calcined at 590° C. for 2 hours in air. The calcined catalyst was crushed and sieved to 250 to 500 microns.

| Sample No. | Pt (wt. %) | Support |
|---|---|---|
| Sample 1 | 0.5 | $CeO_2/Al_2O_3$ |
| Sample 2 | 1 | $CeO_2/Al_2O_3$ |
| Sample 3 | 2 | $CeO_2/Al_2O_3$ |

Example 2

Rhodium Supported on Ceria-Alumina Composite

Powder catalyst samples was prepared by impregnating Rh nitrate solution on $CeO_2/Al_2O_3$ using the incipient wetness technique. The $CeO_2$ in $CeO_2/Al_2O_3$ is 20% by weight. $Al_2O_3$ in $CeO_2/Al_2O_3$ is 80% by weight. The sample shaping procedures are the same as in Example 1 except $Rh/CeO_2/Al_2O_3$ was used.

| Sample No. | Rh (wt. %) | Support |
|---|---|---|
| Sample 4 | 0.5 | $CeO_2/Al_2O_3$ |

Example 3

Platinum Supported on Lanthana-Zirconia Composite ($La_2O_3/ZrO_2$)

Powder catalyst samples were prepared by impregnating Pt tetraamine hydroxide solution on $La_2O_3/ZrO_2$ using the incipient wetness technique. Amount of $La_2O_3$ in $La_2O_3/ZrO_2$ is 9% by weight, whereas the amount of $ZrO_2$ is 91% by weight. The sample shaping procedures are the same as in Example 1 except $Pt/La_2O_3/ZrO_2$ was used.

| Sample No. | Pt (wt. %) | Support |
|---|---|---|
| Sample 8 | 0.5 | $La_2O_3/ZrO_2$ |
| Sample 9 | 1 | $La_2O_3/ZrO_2$ |
| Sample 10 | 2 | $La_2O_3/ZrO_2$ |

Example 4

Rh Supported on $La_2O_3/ZrO_2$

Powder catalyst sample was prepared by impregnating Rh nitrate solution on $La_2O_3/ZrO_2$ using the incipient wetness technique. The $La_2O_3$ in $La_2O_3/ZrO_2$ is 9% by weight, whereas the amount of $ZrO_2$ is 91% by weight. The sample shaping procedures are the same as in Example 1 except $Rh/La_2O_3/ZrO_2$ was used.

| Sample No. | Rh (wt. %) | Support |
|---|---|---|
| Sample 11 | 0.5 | $La_2O_3/ZrO_2$ |

Example 5

Platinum and Rhodium Supported on $CeO_2/Al_2O_3$

Rh was First Impregnated on $CeO_2/Al_2O_3$Followed by Pt Impregnation.

Deionized $H_2O$ was added to the PGM impregnated powder to make a slurry with a solid content of about 30%.

The pH of the slurry was adjusted to 4.0-4.5 using nitric acid. The slurry was milled for 10 min and then dried under stirring. The dried powder was calcined at 590° C. for 2 hours in air. The powder was crushed and sieved to 250-500 mm.

| Sample No. | Pt (wt. %) | Rh (wt. %) | Support |
|---|---|---|---|
| Sample 5 | 0.5 | 0.5 | $CeO_2/Al_2O_3$ |
| Sample 6 | 1 | 0.5 | $CeO_2/Al_2O_3$ |
| Sample 7 | 2 | 0.5 | $CeO_2/Al_2O_3$ |

Example 6

Platinum and Rhodium Supported on $La_2O_3/ZrO_2$

Process of example 5 was repeated except that $La_2O_3/ZrO_2$ was used as support.

| Sample No. | Pt (wt. %) | Rh (wt. %) | Support |
|---|---|---|---|
| Sample 12 | 0.5 | 0.5 | $La_2O_3/ZrO_2$ |
| Sample 13 | 1 | 0.5 | $La_2O_3/ZrO_2$ |
| Sample 14 | 2 | 0.5 | $La_2O_3/ZrO_2$ |

Example 7

Platinum and Rhodium Supported on $CeO_2/Al_2O_3$ and $La_2O_3/ZrO_2$ a. Sample 15 Preparation $CeO_2/Al_2O_3$ and $La_2O_3/ZrO_2$ was first physically mixed at 1:1 weight ratio with stirring. Rh and Pt were sequentially impregnated on the mixture. The impregnated sample was shaped according to procedures described in Example 1.

b. Sample 16 Preparation

Pt was impregnated on $CeO_2/Al_2O_3$ and calcined at 450° C. in air. Rh was separately impregnated on $La_2O_3/ZrO_2$ and calcined at 450° C. in air. The two calcined powders were mixed at 1:1 ratio. On this mixture catalysts, deionized $H_2O$ was added to make a slurry with a solid content of about 30%. The pH of the slurry was adjusted to 4.0-4.5 using nitric acid. The slurry was milled for 10 min and then dried under stirring. The dried powder was calcined at 590° C. for 2 hours in air. The powder was crushed and sieved to 250-500 mm.

c. Sample 17 Preparation:

Rh was impregnated on $CeO_2/Al_2O_3$ and calcined at 450° C. in air. Pt was separately impregnated on $La_2O_3/ZrO_2$ and calcined at 450° C. in air. The two calcined catalyst powders were mixed at 1:1 ratio. On this mixture catalysts, deionized $H_2O$ was added to make a slurry with a solid content of about 30%. The pH of the slurry was adjusted to 4.0-4.5 using nitric acid. The slurry was milled for 10 min and then dried under stirring. The dried powder was calcined at 590° C. for 2 hours in air. The powder was crushed and sieved to 250-500 mm.

| Sample ID | Pt (wt. %) | Rh (wt. %) | PGM/Support |
|---|---|---|---|
| Sample 15 | 2 | 0.5 | 2% Pt_0.5% Rh/($CeO_2/Al_2O_3$ + $La_2O_3/ZrO_2$) |
| Sample 16 | 2 | 0.5 | 4% Pt/$CeO_2/Al_2O_3$ + 1% Rh/$La_2O_3/ZrO_2$ (1:1) |
| Sample 17 | 2 | 0.5 | 1% Rh/$CeO_2/Al_2O_3$ + 4% Pt/$La_2O_3/ZrO_2$ (1:1) |

-continued

| Sample ID | Pt (wt. %) | Rh (wt. %) | PGM/Support |
|---|---|---|---|

Example 8

Platinum Supported on Alumina ($Al_2O_3$)

Powder catalyst samples were prepared by impregnating Pt tetraamine hydroxide solution on $Al_2O_3$ using the incipient wetness technique. The sample shaping procedures are the same as in Example 1 except $Pt/Al_2O_3$ catalysts were used.

| Sample No. | Pt (wt. %) | Support |
|---|---|---|
| Sample 18 | 0.5 | $Al_2O_3$ |
| Sample 19 | 1 | $Al_2O_3$ |
| Sample 20 | 2 | $Al_2O_3$ |

Example 9

Rhodium Supported on Alumina

Powder catalyst samples was prepared by impregnating Rh nitrate solution on $Al_2O_3$ using the incipient wetness technique. The sample shaping procedures are the same as in Example 1 except $Rh/Al_2O_3$ was used.

| Sample No. | Rh (wt. %) | Support |
|---|---|---|
| Sample 21 | 0.5 | $Al_2O_3$ |

Example 10

Platinum and Rhodium Supported on Alumina

Process of Example 5 was repeated except that alumina was used as support. The sample shaping procedures are the same as in Example 1 except Pt_Rh/$Al_2O_3$ catalysts were used.

| Sample No. | Pt (wt. %) | Rh (wt. %) | Support |
|---|---|---|---|
| Sample 22 | 0.5 | 0.5 | $Al_2O_3$ |
| Sample 23 | 1 | 0.5 | $Al_2O_3$ |
| Sample 24 | 2 | 0.5 | $Al_2O_3$ |

Example 11

Platinum and Rhodium Supported on Oxygen Storage Component (OSC1)

OSC1 comprises: 11% $CeO_2$, 74% $ZrO_2$, 2% $La_2O_3$, 8% $Y_2O_3$, 5% $Nd_2O_3$.

The PGM deposition procedures were same as in Example 1 (for Pt), Example 2 (for Rh) and Example 5 (for Pt and Rh) except that OSC1 was used as support. The sample shaping procedures are the same as in Example 1 except OSC1 supported catalysts were used.

| Sample No. | Pt (wt. %) | Rh (wt. %) | Support |
|---|---|---|---|
| Sample 25 | 2 | 0 | OSC1 |

-continued

| Sample No. | Pt (wt. %) | Rh (wt. %) | Support |
|---|---|---|---|
| Sample 26 | 0 | 0.5 | OSC1 |
| Sample 27 | 2 | 0.5 | OSC1 |

Example 12

Platinum and Rhodium Supported on OSC2

OSC2 comprises: 20% $CeO_2$, 70% $ZrO_2$, 5% $La_2O_3$, 5% $Y_2O_3$.

The PGM deposition procedures are same as in Example 1 (for Pt), Example 2 (for Rh) and Example 5 (for Pt and Rh) except that OSC2 was used as support. The sample shaping procedures are the same as in Example 1 except OSC2 supported catalysts were used.

| Sample No. | Pt (wt. %) | Rh (wt. %) | Support |
|---|---|---|---|
| Sample 28 | 2 | 0 | OSC2 |
| Sample 29 | 0 | 0.5 | OSC2 |
| Sample 30 | 2 | 0.5 | OSC2 |

Example 13

Platinum and Rhodium Supported on OSC3

OSC3 comprises: 40% $CeO_2$, 50% $ZrO_2$, 5% $La_2O_3$, 5% $Y_2O_3$.

The PGM deposition procedures are same as in Example 1 (for Pt), Example 2 (for Rh) and Example 5 (for Pt and Rh) except that OSC3 was used as support. The sample shaping procedures are the same as in Example 1 except OSC3 supported catalysts were used.

| Sample No. | Pt (wt. %) | Rh (wt. %) | Support |
|---|---|---|---|
| Sample 31 | 2 | 0 | OSC3 |
| Sample 32 | 0 | 0.5 | OSC3 |
| Sample 33 | 2 | 0.5 | OSC3 |

Example 14

Platinum and Rhodium Supported on Mixed Supports

Two different supports were mixed at 1:1 weight ratio before PGM impregnation. The PGM deposition procedures are same as in Example 7 (Sample 15) except that mixture of $La_2O_3/ZrO_2$ and OSC3 or $CeO_2/Al_2O_3$ and OSC2 was used instead of mixture of $CeO_2/Al_2O_3$ and $La_2O_3/ZrO_2$. The sample shaping procedures are described in Example 1.

| Sample No. | Pt (wt. %) | Rh (wt. %) | Support |
|---|---|---|---|
| Sample 34 | 2 | 0.5 | $La_2O_3/ZrO_2$ + OSC3 (1:1) |
| Sample 35 | 2 | 0.5 | $CeO_2/Al_2O_3$ + OSC2 (1:1) |

Example 15

Platinum and Rhodium Supported on Ceria-Alumina Composites ($CeO_2/Al_2O_3$) as a Function of $CeO_2$ Loading For Samples 36, 37 and 38, process of example 5 was repeated except that the $CeO_2/Al_2O_3$ composite with 10% $CeO_2$, 30% $CeO_2$, 50% $CeO_2$ was used, respectively.

| Sample No. | Pt (wt. %) | Rh (wt. %) | Support |
|---|---|---|---|
| Sample 36 | 2 | 0.5 | $CeO_2/Al_2O_3$ (10% $CeO_2$) |
| Sample 37 | 2 | 0.5 | $CeO_2/Al_2O_3$ (30% $CeO_2$) |
| Sample 38 | 2 | 0.5 | $CeO_2/Al_2O_3$ (50% $CeO_2$) |

Example 16

Catalytic Performance Measurement:

All catalysts were aged at 1050° C. for 5 h with 10% $H_2O$ under an alternating lean/rich feed (10 minutes 4% air/10 minutes 4% $H_2/N_2$). The aged catalysts were evaluated using light-off tests with a I=1 oscillating feed (1=0.95/1.05 cycled at 1 Hz) from 175 to 450° C. at a monolith equivalent GHSV of 70,000 $h^{-1}$. For light-off tests, the lean feed (I=1.05) consists of 0.7% CO, 0.22% $H_2$, 3000 ppm HC (C1) (propene:propane=2:1), 1500 ppm NO, 14% $CO_2$, 10% $H_2O$ and ~1.8% $O_2$; while the rich feed (I=0.95) includes 2.33% CO, 0.77% $H_2$, 3000 ppm HC (C1), 1500 ppm NO, 14% $CO_2$, 10% $H_2O$ and ~0.7% $O_2$. The exact lambda values are fine-tuned by adjusting the $O_2$ level based on an upstream λ-sensor.

For $CeO_2/Al_2O_3$ supported catalysts, the degrees of performance improvement on the Pt/Rh compositions relative to the Rh reference are varied for CO, NO and HC. For CO conversion, the improvement is marginal. However, for NO and HC conversions, the activity improvement is pronounced in both low and high temperature regions. For example, the HC T50 (temperature at 50% conversion) is 55° C. lower on 2% Pt/0.5% Rh/$CeO_2/Al_2O_3$ than that over the Rh reference. The difference in HC conversion at 325° C. is 61%. The comparative light-off performance for CO, NO and HC conversions for samples 1-7 (containing $CeO_2/Al_2O_3$ as support) is provided in FIG. 1.

Figure 2:
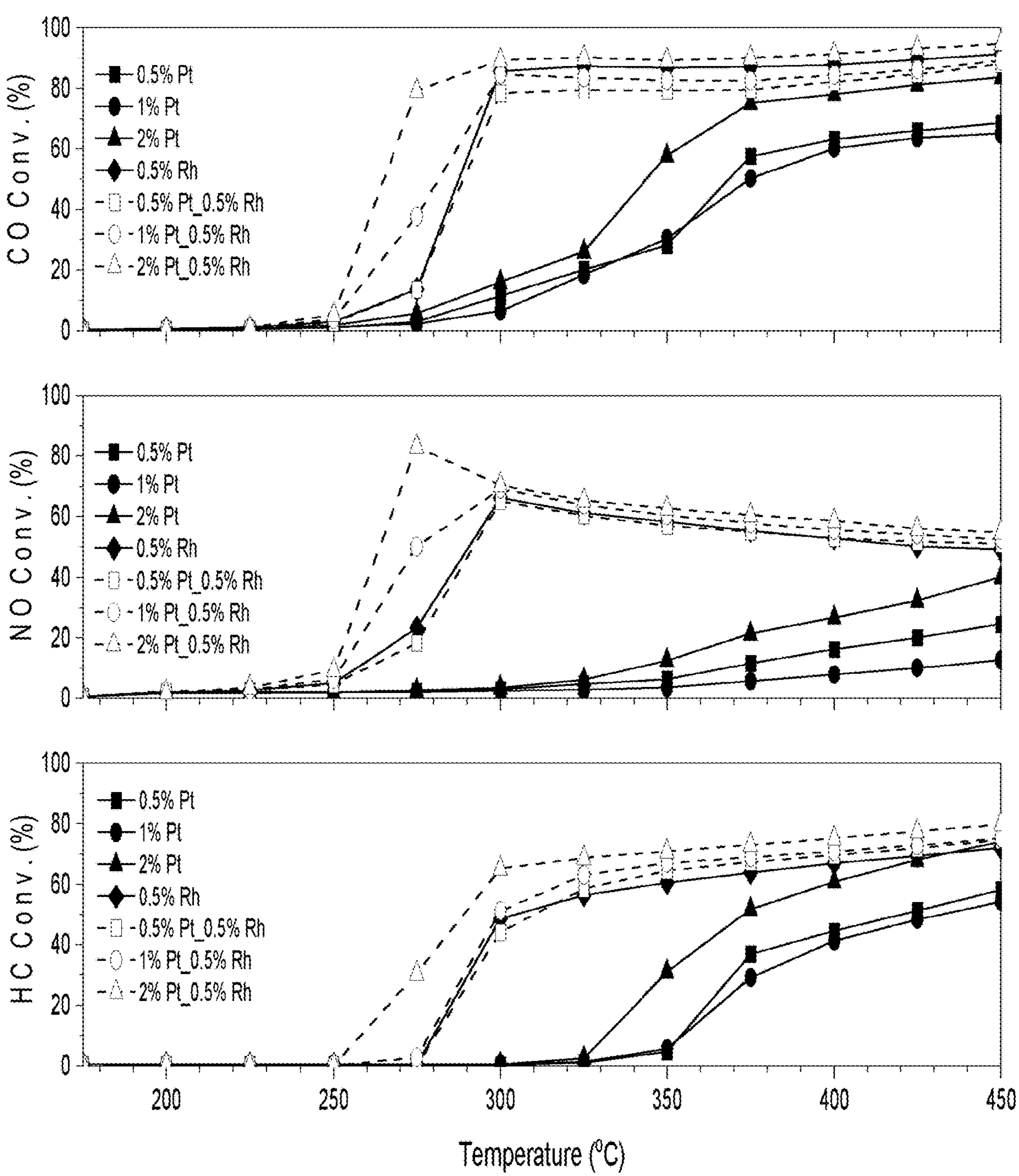
FIG. 2 illustrates light-off performance of Pt—Rh catalysts supported on $La_2O_3/ZrO_2$ for CO, NO and HC conversions.

FIG. 2 shows the comparative light-off performance for CO, NO and HC conversions for samples 8-14 (containing $La_2O_3/ZrO_2$ as support). The performance improvement of the Pt/Rh catalysts relative to the Rh reference is proportional to the Pt loading. For 2% Pt_0.5% Rh, the light-off T50 is 22, 27 and 19° C. lower for CO, NO and HC conversion, respectively.

Figure 3:
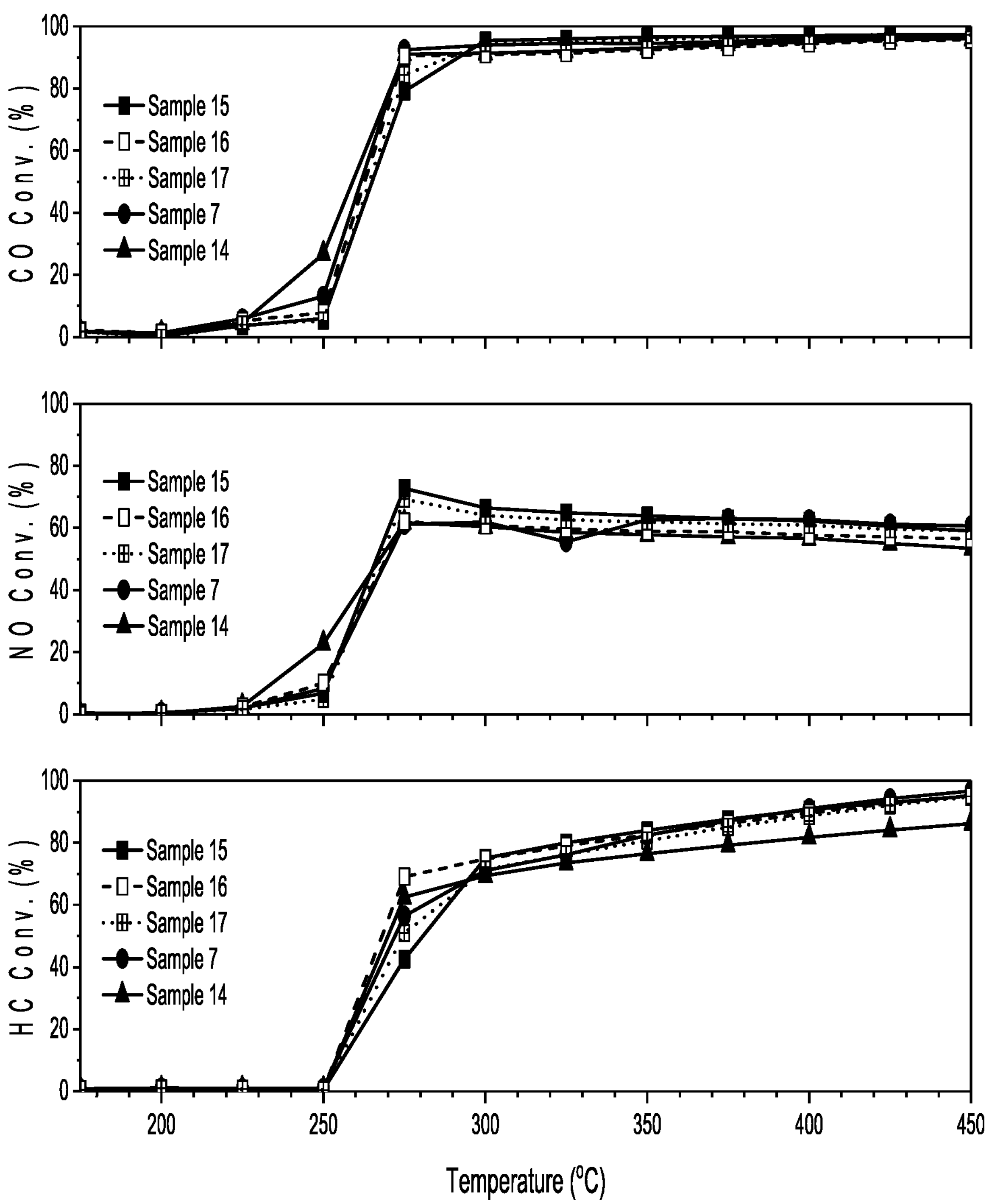
FIG. 3 illustrates light-off performance Pt—Rh catalysts supported on $CeO_2/Al_2O_3$ and $La_2O_3/ZrO_2$ for CO, NO and HC conversions.

FIG. 3 shows comparative light-off performance for CO, NO and HC conversions for Samples 15, 16, 17 (containing two supports namely $CeO_2/Al_2O_3$ and $La_2O_3/ZrO_2$). The three samples show similar efficiency for CO conversion. Samples 15 and 17 are found to be more active for NOx conversion, while Samples 15 and 16 are the best for HC conversion. Overall, Sample 15 is found to produce improved CO, NO and HC conversion.

Figure 4:
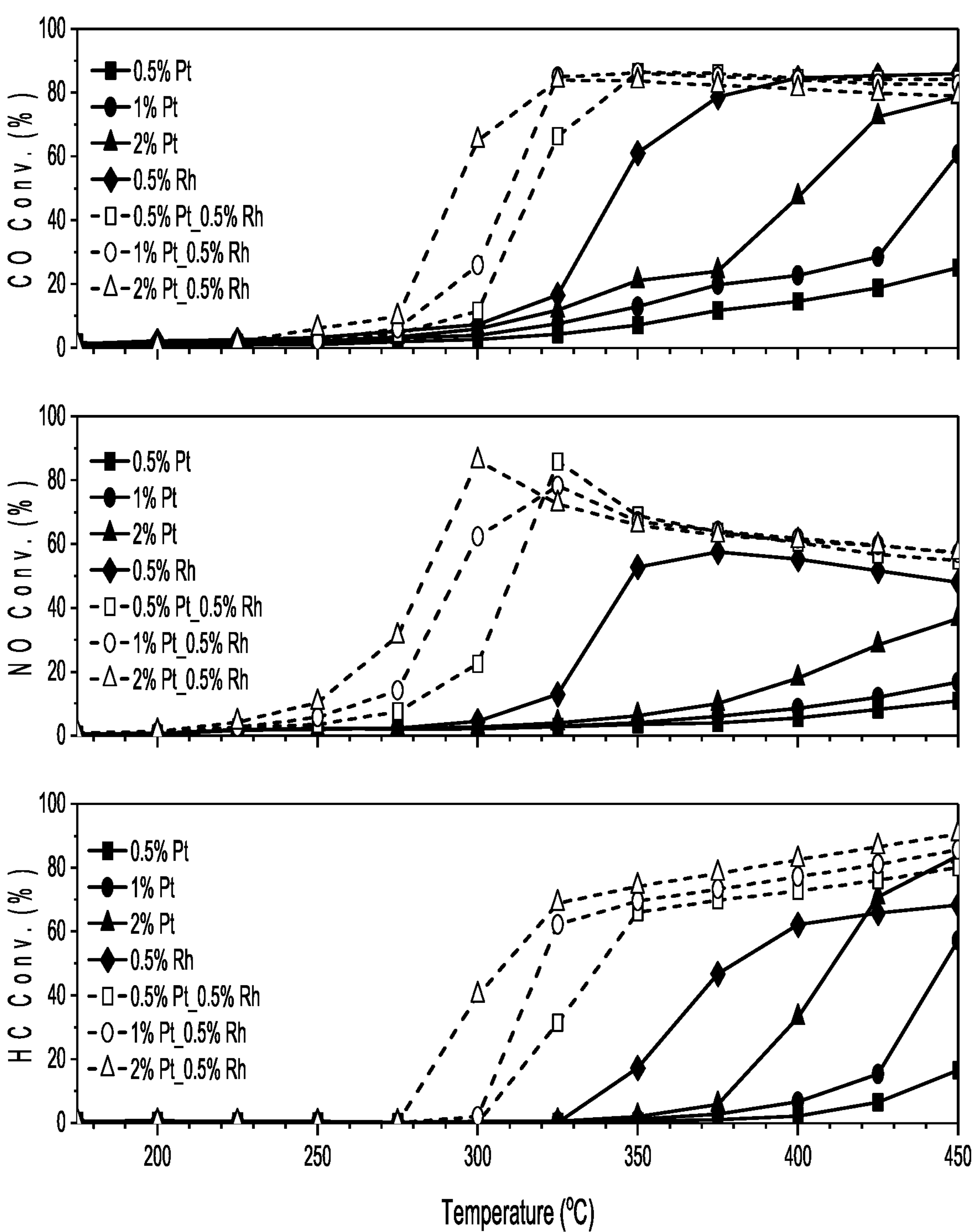
FIG. 4 illustrates light-off performance of Pt—Rh catalysts supported on $Al_2O_3$ for CO, NO and HC conversions.

FIG. 4 shows the light-off performance of $Al_2O_3$ supported catalysts. The Pt reference catalysts show much lower activities for CO, NO and HC compared to the Rh reference. The difference in light off $T_{50}$ between 2% Pt and 0.5% Rh is 58, >100, and 29° C. for CO, NO and HC, respectively. When Pt and Rh are combined, the activity is significantly higher than the sum of the individuals, and the activity of Pt/Rh composition is proportional to the Pt loading in the catalyst. For example, the HC conversions at 325° C. are 31, 62 and 68% on 0.5% Pt/0.5% Rh, 1% Pt/0.5% Rh and 2% Pt/0.5% Rh, respectively, while the conversion is zero for all the individual component catalysts.

Figure 5:
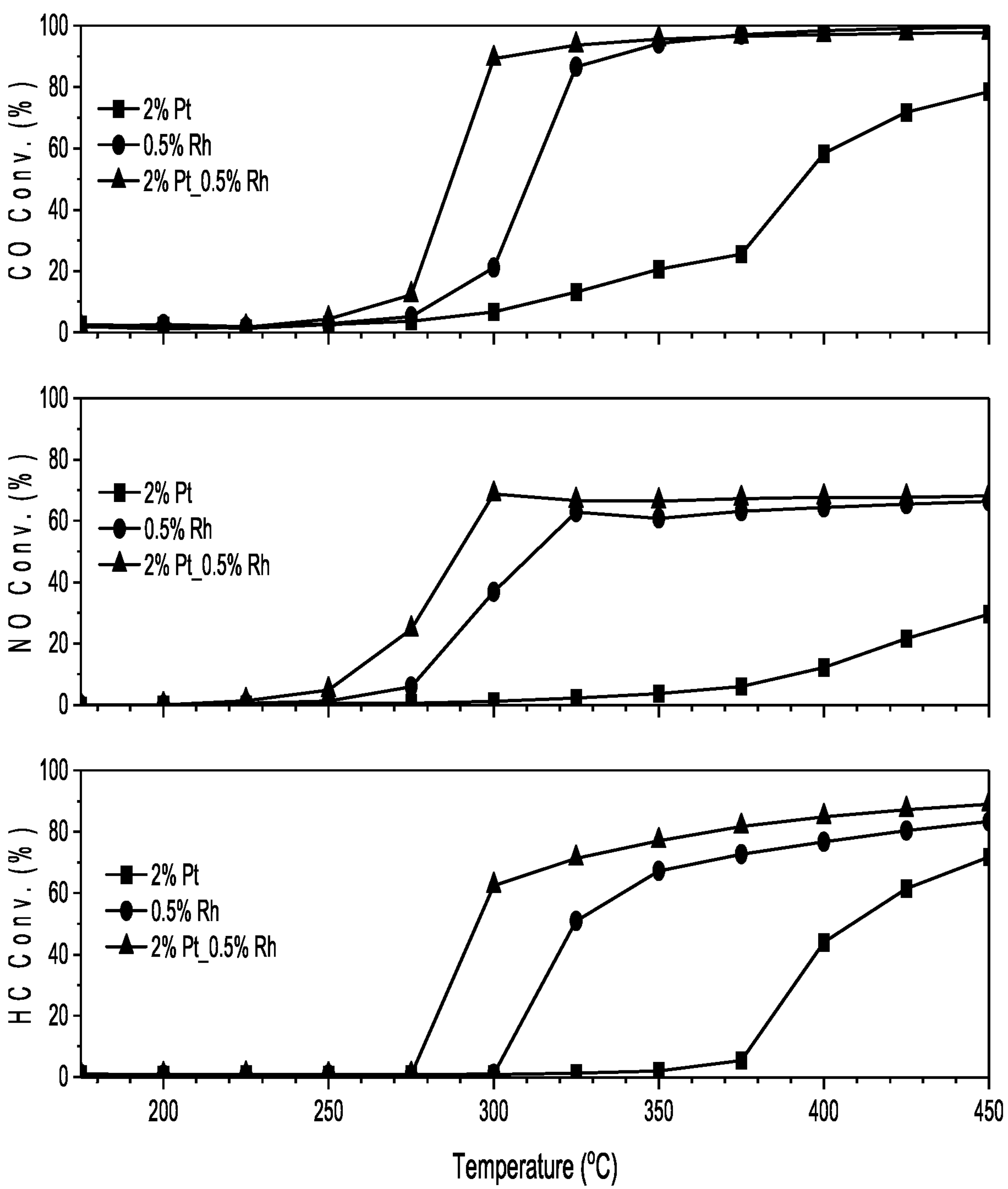
FIG. 5 illustrates light-off performance of Pt—Rh catalysts supported on OSC1 for CO, NO and HC conversions.
Figure 6:
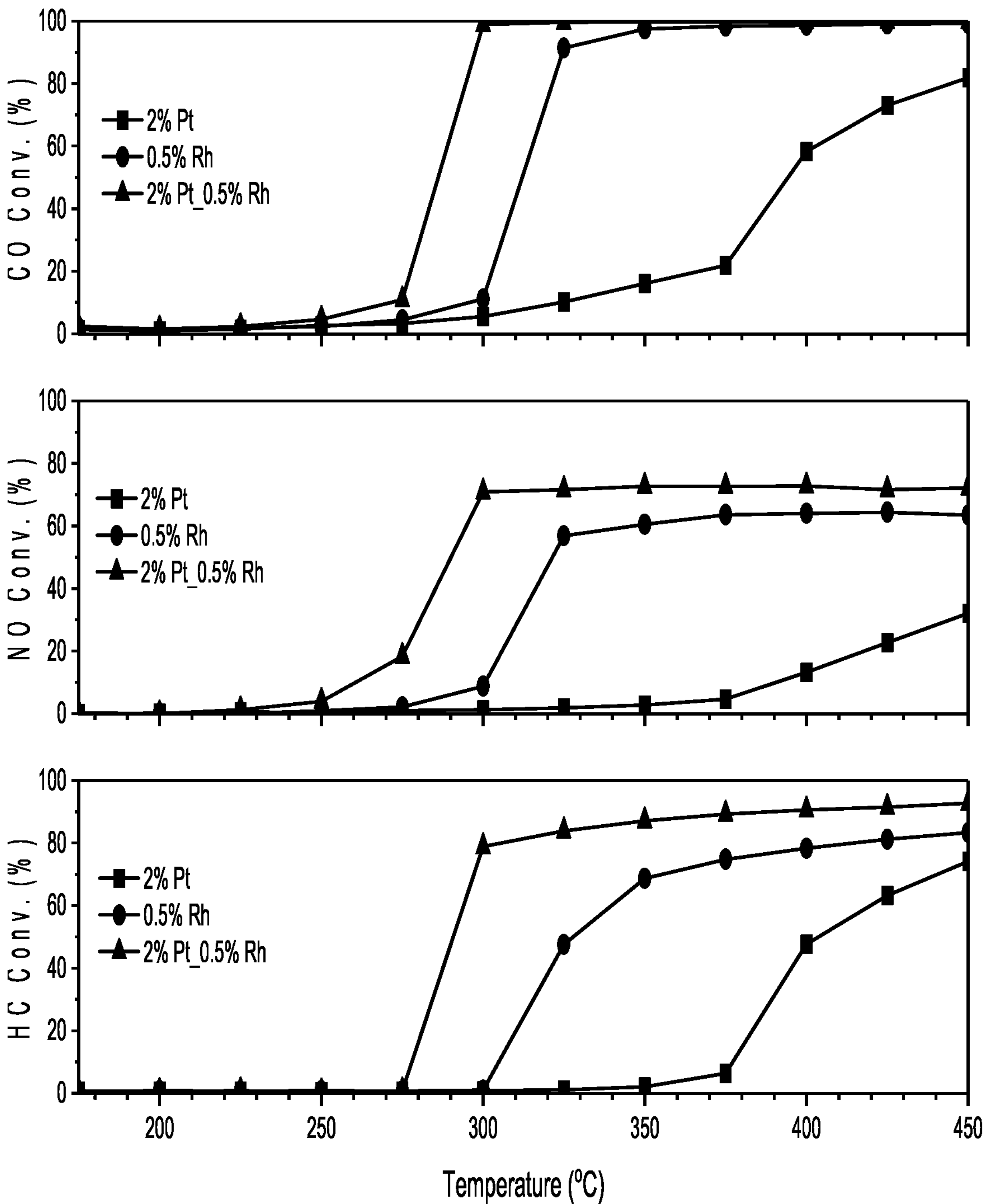
FIG. 6 illustrates light-off performance of Pt—Rh catalysts supported on OSC2 for CO, NO and HC conversions.
Figure 7:
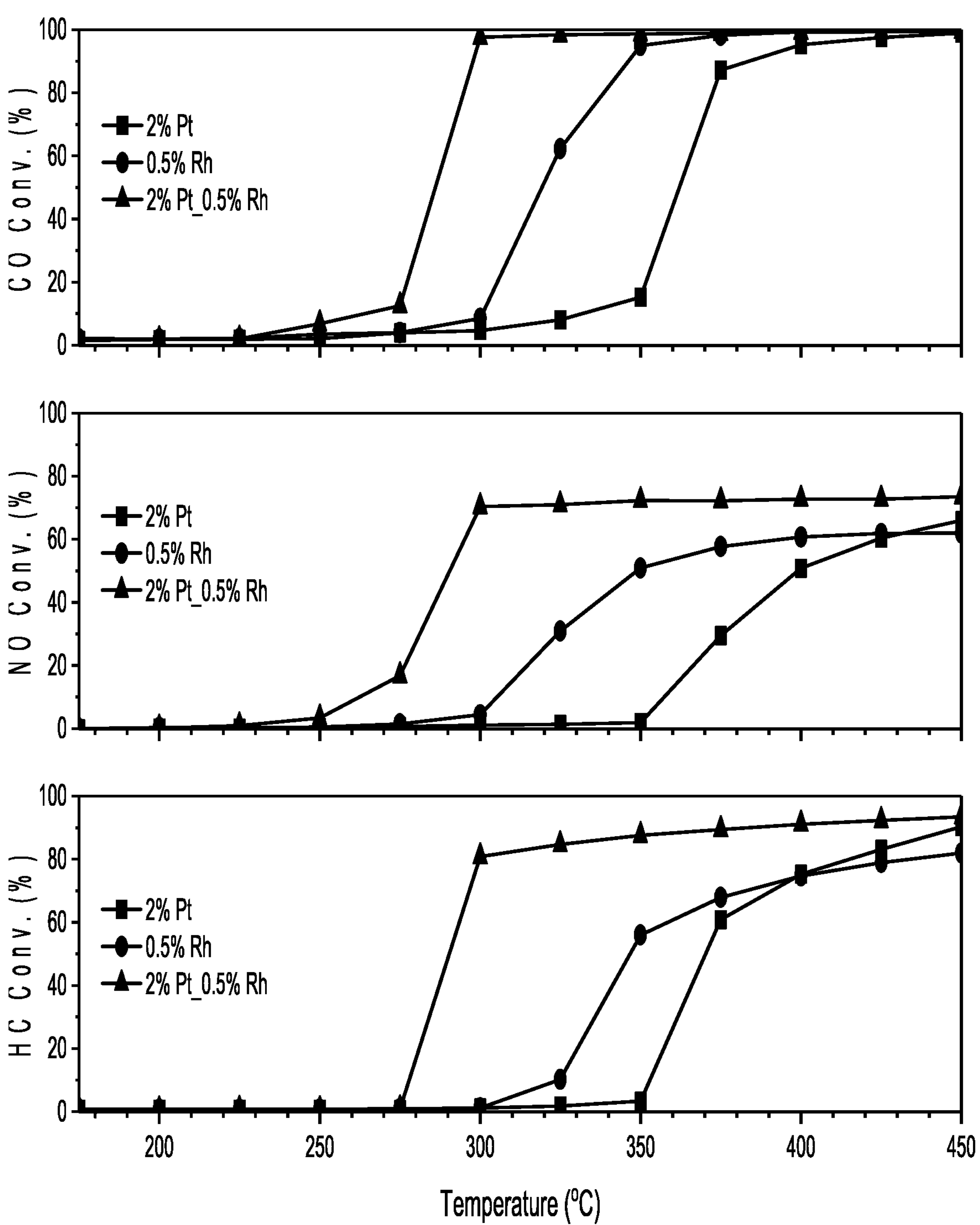
FIG. 7 illustrates light-off performance of Pt—Rh catalysts supported on OSC3 for CO, NO and HC conversions.

FIGS. 5 to 7 show the performance results of 2% Pt, 0.5% Rh and 2% Pt/0.5% Rh supported on OSC1 (Samples 25-27), OSC2 (Samples 28-30) and OSC3 (Samples 31-33), respectively. On each OSC support, the Pt/Rh composition (2% Pt and 0.5% Rh) shows significantly lower light-off temperature relative to the Rh reference for CO, NO and HC conversion. The Pt/Rh composition also increases the NO and HC conversions at high temperatures. The extent of improvement appears to be proportional to the ceria content in the OSC support.

Figure 8:
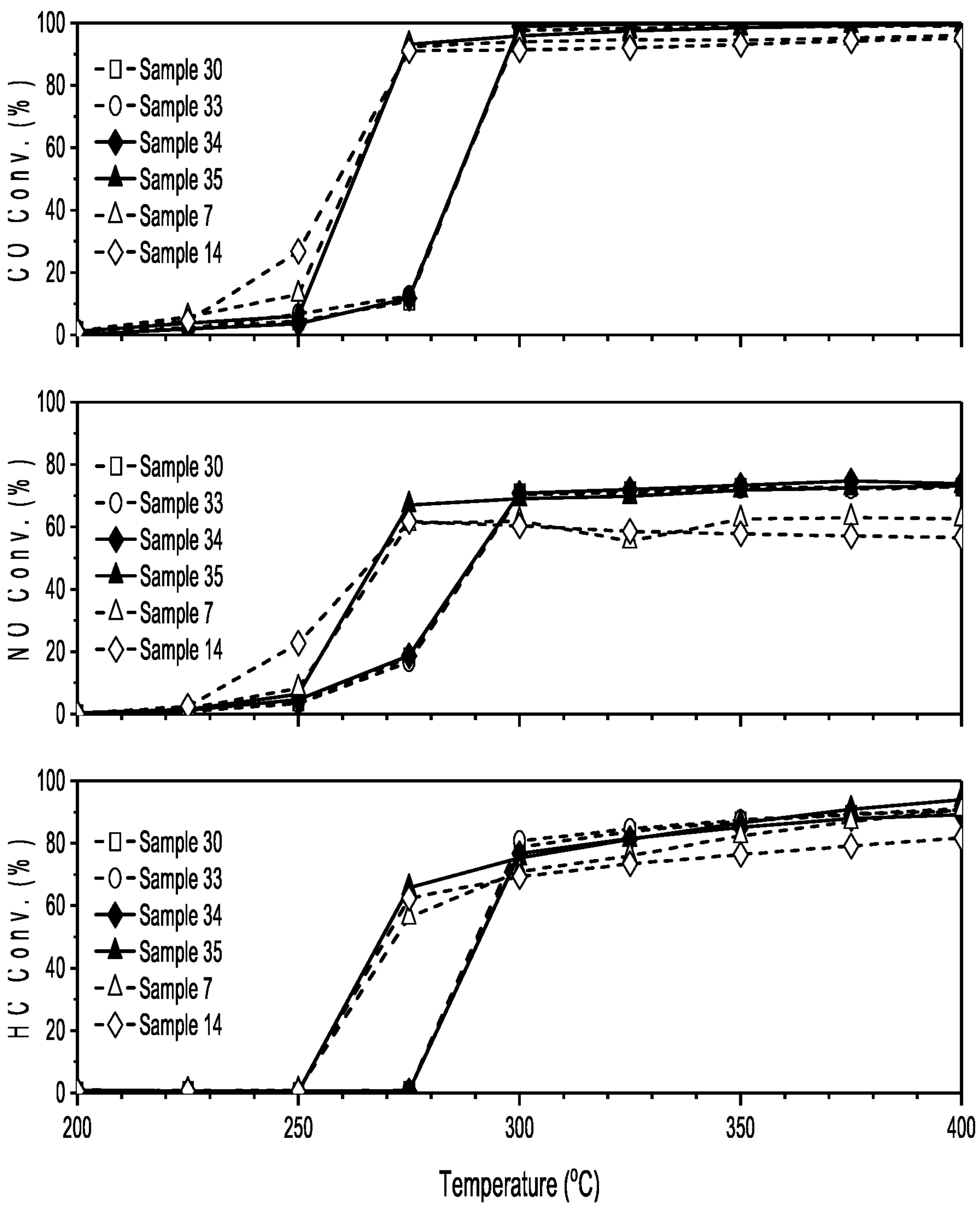
FIG. 8 illustrates light-off performance of Pt—Rh catalysts supported on mixtures of supports for CO, NO and HC conversions.

FIG. 8 show the performance of the Pt/Rh composition (2% Pt and 0.5% Rh) supported on mixtures of supports. Comparing to the OSC supported Pt/Rh catalysts (Samples 30 and 33), $CeO_2/Al_2O_3$ and $La_2O_3/ZrO_2$ supported Pt/Rh catalysts (Samples 7 and 14) show lower light-off temperatures and lower high-temperature conversions. The Pt/Rh supported on 1:1 mixture of $La_2O_3/ZrO_2$ and OSC3 (Sample 34) shows a performance feature that is similar with Pt/Rh on OSC3 (high light-off temperature and high high-temperature conversion). However, when the Pt/Rh composition is supported on the 1:1 mixture of $CeO_2/Al_2O_3$ and OSC2 (Sample 35), the catalyst shows both low light-off temperature and high high-temperature conversion.

Comparative light-off temperatures $T_{50}$ and conversion at 400° C. for Pt/Rh (2% Pt and 0.5% Rh) compositions supported on various single and mixture supports are provided in the following table:

| Sample | Support material for 2% Pt and | Light-off T50 (° C.) | | | Conversion at 400° C. (%) | | |
|---|---|---|---|---|---|---|---|
| No. | 0.5% Rh | CO | NO | HC | CO | NO | HC |
| 24 | $Al_2O_3$ | 292 | 288 | 308 | 81 | 55 | 82 |
| 7 | $CeO_2/Al_2O_3$ | 261 | 272 | 274 | 96 | 63 | 91 |
| 14 | $La_2O_3/ZrO_2$ | 259 | 269 | 272 | 95 | 57 | 82 |
| 27 | OSC1 | 287 | 290 | 297 | 97 | 68 | 85 |
| 30 | OSC2 | 286 | 291 | 291 | 100 | 73 | 91 |
| 33 | OSC3 | 286 | 291 | 291 | 99 | 73 | 91 |
| 15 | $CeO_2/Al_2O_3$ + $La_2O_3/ZrO_2$ | 265 | 267 | 281 | 97 | 62 | 91 |
| 34 | $La_2O_3/ZrO_2$ + OSC3 | 286 | 291 | 292 | 100 | 74 | 89 |
| 35 | $CeO_2/Al_2O_3$ + OSC2 | 263 | 269 | 270 | 100 | 73 | 94 |

Catalysts with Pt/Rh supported on $CeO_2/Al_2O_3$ and $La_2O_3/ZrO_2$ show lower light-off temperatures (T50s) compared to $Al_2O_3$ and OSC supported Pt/Rh catalysts.

OSC supported Pt/Rh catalysts show higher high-temperature conversions. The Pt/Rh catalyst supported on the mixture of $CeO_2/Al_2O_3$ and OSC2 yields high catalytic activity at both low and high temperatures.

Comparative light-off temperatures ($T_{50}$) for Pt/Rh (2% Pt and 0.5% Rh) compositions supported on $CeO_2/Al_2O_3$ composites of various $CeO_2$ loadings are provided in the following table:

| Sample No. | $CeO_2$ (wt. %) | CO T50 (° C.) | NO T50 (° C.) | HC T50 (° C.) |
|---|---|---|---|---|
| 24 | 0 | 292 | 288 | 308 |
| 36 | 10 | 275 | 280 | 292 |
| 7 | 20 | 260 | 270 | 271 |
| 37 | 30 | 261 | 268 | 271 |
| 38 | 50 | 281 | 286 | 299 |

The Pt/Rh catalysts supported on the $CeO_2/Al_2O_3$ composites with 20% and 30% $CeO_2$ show lowest light-off temperatures (T50s) for CO, NO and HC. Increasing the $CeO_2$ loading in the composite beyond 30% or decreasing the loading below 20% tends to increase the light-off temperatures. The catalyst on the undoped support (pure $Al_2O_3$), Sample 24, results in the lowest activity.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

The invention claimed is:

1. A catalyst composition comprising:

a) platinum;

b) rhodium; and c) a ceria-alumina composite and a zirconia composite, wherein platinum is supported on the ceria-alumina composite, zirconia composite or both in an amount of 0.1 to 10 wt. %, based on the total weight of the ceria-alumina composite and zirconia composite, wherein rhodium is supported on the ceria-alumina composite, zirconia composite or both in an amount of 0.1 to 10 wt. %, based on the total weight of the ceria-alumina composite and zirconia composite, wherein $CeO_2$ in the ceria-alumina composite is 1.0 to 50 wt. %, based on the total weight of the ceria-alumina composite, wherein the amount of $ZrO_2$ in the zirconia composite is 50 to 99 wt. %, based on the total weight of the zirconia composite.

2. The catalyst composition according to claim 1, wherein the total amount of the ceria-alumina composite and zirconia composite in the catalyst composition is 10 to 90 wt. % based on the total weight of the catalyst composition.

3. The catalyst composition according to claim 1, wherein the amount of $CeO_2$ in the zirconia composite is $<0.001$ wt. %, based on the total weight of the zirconia composite.

4. The catalyst composition according to claim 1, wherein platinum is supported on the ceria-alumina composite and rhodium is supported on the zirconia composite, or wherein platinum is supported on the zirconia composite and rhodium is supported on the ceria-alumina composite, or wherein platinum and rhodium are supported on both the ceria-alumina composite and the zirconia composite.

5. The catalyst composition according to claim 1, wherein the weight proportion of the ceria-alumina composite to the zirconia composite is 1:4 to 4:1.

6. The catalyst composition according to claim 1, wherein the zirconia composite comprises 85 wt. % or more $ZrO_2$ and 15 wt. % or less rare-earth metal(s) in oxide form, based on the total weight of the zirconia composite, wherein the rare-earth metal in oxidic form is selected from lanthanum, praseodymium, yttrium, neodymium, and any combination thereof.

7. The catalyst composition according to claim 6, wherein the zirconia composite comprises 85 to 95 wt. % of $ZrO_2$ and 5.0 to 15 wt. % of lanthana, based on the total weight of the zirconia composite.

8. The catalyst composition according to claim 1, wherein the amount of $CeO_2$ in ceria-alumina composite is 5.0 to 50 wt. %, 15 to 35 wt. %, or 20 to 30 wt. %, based on the total weight of the ceria-alumina composite.

9. The catalyst composition according to claim 1, wherein the average particle size of ceria in the ceria-alumina composite is less than 20 nm, as measured by transmission electron microscopy.

10. A process for preparing the catalyst composition according to claim 1, wherein the process comprises:

impregnating platinum on a ceria-alumina composite, a zirconia composite or a mixture thereof to obtain a first mixture;

impregnating rhodium on a ceria-alumina composite, a zirconia composite or mixture thereof to obtain a second mixture; and mixing the first mixture and the second mixture together to obtain the catalyst composition.

11. A process for preparing the catalyst composition according to claim 1, wherein the process comprises sequential impregnation of rhodium and platinum on a mixture of a ceria-alumina composite and a zirconia composite to obtain the catalyst composition.

12. A catalytic article comprising the catalyst composition according to claim 1, deposited on a substrate.

13. The catalytic article according to claim 12, wherein the catalytic article is a single layered catalytic article and has hydrothermal stability at an aging temperature of in the range of 950° C. to 1050° C.

14. The catalytic article according to claim 12, wherein the catalytic article is a bi-layered article comprising a) a first layer, b) a second layer, and c) a substrate, wherein the first layer comprises platinum supported on a ceria-alumina composite, a zirconia composite or a mixture thereof, wherein the second layer comprises rhodium supported on a ceria-alumina composite, a zirconia composite or a mixture thereof, wherein the first layer is deposited at least partly on the substrate and the second layer is deposited at least partly on the first layer, wherein the amount of $CeO_2$ in the ceria-alumina composite is 5.0 to 50 wt. %, based on the total weight of the ceria-alumina composite, wherein the amount of $ZrO_2$ in the zirconia composite is 50 to 99 wt. %, based on the total weight of the zirconia composite, wherein the amount of platinum in the first layer is 0.3 to 5.0 wt. %, based on the total weight of the first layer, wherein the amount of rhodium in the second layer is 0.1 to 1.0 wt. %, based on the total weight of the second layer.

15. The catalytic article according to claim 12, wherein the catalytic article is a bi-layered article comprising a) a first layer, b) a second layer, and c) a substrate, wherein the first layer comprises rhodium supported on a ceria-alumina composite, a zirconia composite or a mixture thereof, wherein the second layer comprises platinum supported on a ceria-alumina composite, a zirconia composite or a mixture thereof, wherein the first layer is deposited at least partly on the substrate and the second layer is deposited at least partly on the first layer, wherein the amount of $CeO_2$ in the ceria-alumina composite is 5.0 to 50 wt. %, based on the total weight of the ceria-alumina composite, wherein the amount of $ZrO_2$ in the zirconia composite is 50 to 99 wt. %, based on the total weight of the zirconia composite, wherein the amount of platinum in the second layer is 0.3 to 5.0 wt. %, based on the total weight of the second layer, wherein the amount of rhodium in the first layer is 0.1 to 1.0 wt. %, based on the total weight of the first layer.

16. The catalytic article according to claim 12, wherein the catalytic article has a zoned configuration comprising a first zone and second zone.

17. The catalytic article according to claim 12, wherein the catalytic article further comprises an oxygen storage component, the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof.

18. A process for preparation of the catalytic article according to claim 12, wherein said process comprises:

preparing a slurry comprising platinum supported on a ceria alumina composite, a zirconia composite or a mixture thereof and rhodium supported on ceria-alumina composite, zirconia composite or a mixture thereof, depositing the slurry on a substrate to obtain a catalytic article followed by calcination at a temperature ranging from 400 to 700° C., wherein the step of preparing the slurry comprises a technique selected from incipient wetness impregnation, incipient wetness co-impregnation, and post-addition.

19. A process for the preparation of the catalytic article according to claim 12, wherein said process comprises:

preparing a slurry comprising platinum and rhodium supported on a mixture of a ceria-alumina composite and a zirconia composite;

depositing the slurry on a substrate to obtain a catalytic article followed by calcination at a temperature ranging from 400 to 700° C., wherein the step of preparing the slurry comprises a technique selected from incipient wetness impregnation, incipient wetness co-impregnation, and post-addition.

20. An exhaust gas treatment system for internal combustion engines, said system comprising the catalytic article according to claim 12.

21. A method of reducing hydrocarbons, carbon monoxide, and nitrogen oxide levels in a gaseous exhaust stream, the method comprising contacting the gaseous exhaust stream with the catalytic article according to claim 12.

* * * * *